United States Patent
Kinjo et al.

(10) Patent No.: US 9,263,896 B2
(45) Date of Patent: Feb. 16, 2016

(54) CURRENT CONTROL DEVICE, CURRENT CONTROL METHOD, AND CURRENT CONTROL SYSTEM

(75) Inventors: Tatsuto Kinjo, Osaka (JP); Mitsuru Kaji, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 536 days.

(21) Appl. No.: 13/877,341

(22) PCT Filed: Aug. 1, 2012

(86) PCT No.: PCT/JP2012/004887
§ 371 (c)(1),
(2), (4) Date: Apr. 2, 2013

(87) PCT Pub. No.: WO2013/018364
PCT Pub. Date: Feb. 7, 2013

(65) Prior Publication Data
US 2013/0234512 A1   Sep. 12, 2013

(30) Foreign Application Priority Data

Aug. 4, 2011 (JP) ................................. 2011-171395
Mar. 16, 2012 (JP) ................................. 2012-060620

(51) Int. Cl.
*H02J 4/00* (2006.01)
*H02M 3/158* (2006.01)
(Continued)

(52) U.S. Cl.
CPC ............... *H02J 4/00* (2013.01); *H02M 3/1588* (2013.01); *H02M 3/33592* (2013.01); *H02M 2001/0003* (2013.01); *Y02B 70/1466* (2013.01); *Y02B 70/1475* (2013.01); *Y10T 307/359* (2015.04)

(58) Field of Classification Search
CPC ... H02J 4/00; H02M 3/1588; H02M 3/33592; H02M 2001/0003; Y10T 307/359; Y02B 70/1466; Y02B 70/1475
See application file for complete search history.

(56) References Cited

U.S. PATENT DOCUMENTS 3,745,246 A * 7/1973 Kashiwagi ........... H04N 3/1856
                                                        315/14
4,105,933 A * 8/1978 Inoue ..................... H03K 4/725
                                                        315/387

(Continued)

FOREIGN PATENT DOCUMENTS

JP          4-308473        10/1992
JP          2008-278700     11/2008

OTHER PUBLICATIONS

International Search Report issued Aug. 28, 2012 in International (PCT) Application No. PCT/JP2012/004887.

(Continued)

*Primary Examiner* — Zeev V Kitov
(74) *Attorney, Agent, or Firm* — Wenderoth, Lind & Ponack, L.L.P.

(57) ABSTRACT

A current control device is a current control device which supplies current to a load device by controlling a current source including a first electric appliance and a voltage source including a second electric appliance. The current control device includes: an obtaining unit which obtains information indicating non-linear components included in load current that is current supplied to the load device; a determining unit which determines a first current that includes the non-linear components; and a notifying unit which notifies the current source of a command value for causing the current source to output the first current to cause the current source to output the first current.

15 Claims, 22 Drawing Sheets

(51) Int. Cl.
*H02M 3/335* (2006.01)
*H02M 1/00* (2007.01)

(56) References Cited

U.S. PATENT DOCUMENTS

| | | | | |
|---|---|---|---|---|
| 6,285,139 | B1 * | 9/2001 | Ghanem | G01R 31/2653 307/60 |
| 6,400,102 | B1 * | 6/2002 | Ghanem | G01R 31/2653 307/60 |
| 7,193,872 | B2 * | 3/2007 | Siri | H02M 3/33592 363/95 |
| 7,446,511 | B2 * | 11/2008 | Wu | H02J 3/1842 323/207 |
| 7,896,115 | B2 * | 3/2011 | Ono | B60K 1/04 180/65.31 |
| 8,459,399 | B2 * | 6/2013 | Ohashi | 180/312 |
| 2007/0007060 | A1 * | 1/2007 | Ono | B60K 1/04 180/65.31 |

OTHER PUBLICATIONS

"Guideline of Harmonics Reduction for Consumers who have High or Ultra-High Voltage Power Receiving Facilities", Nuclear and Industrial Safety Agency, Jan. 2004, http://www.nisa.meti.go.jp/oshirase/2004/files/160131oshirase.pdf, with partial English translation.

* cited by examiner

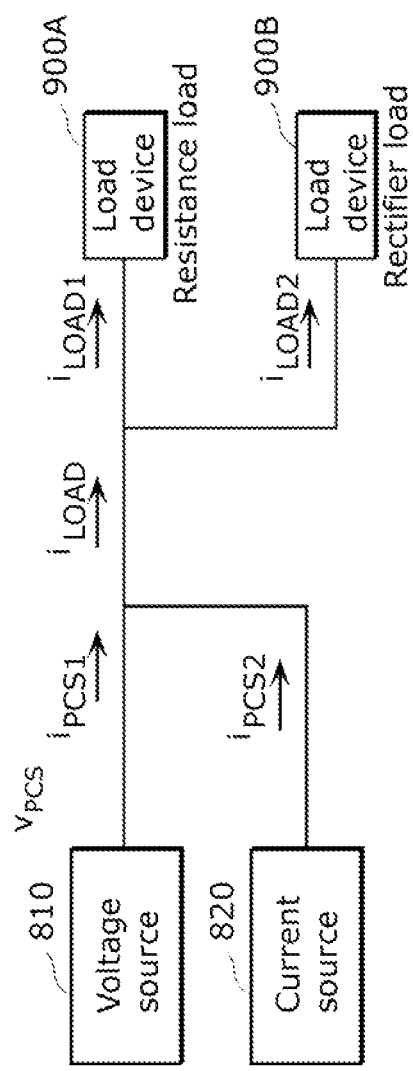

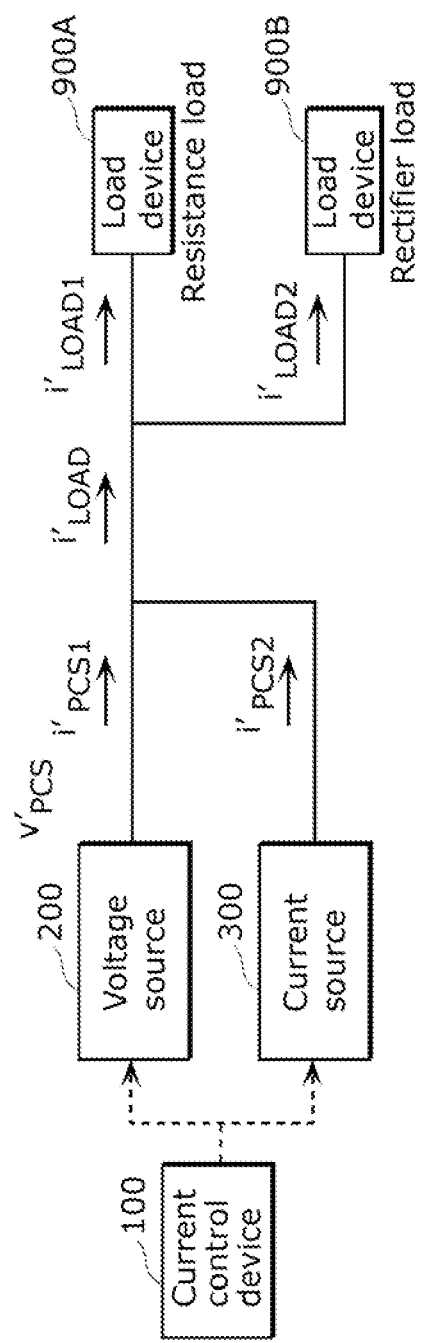

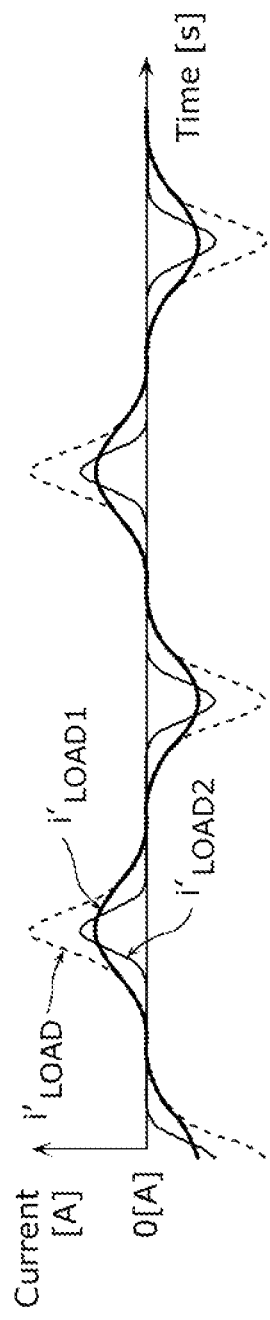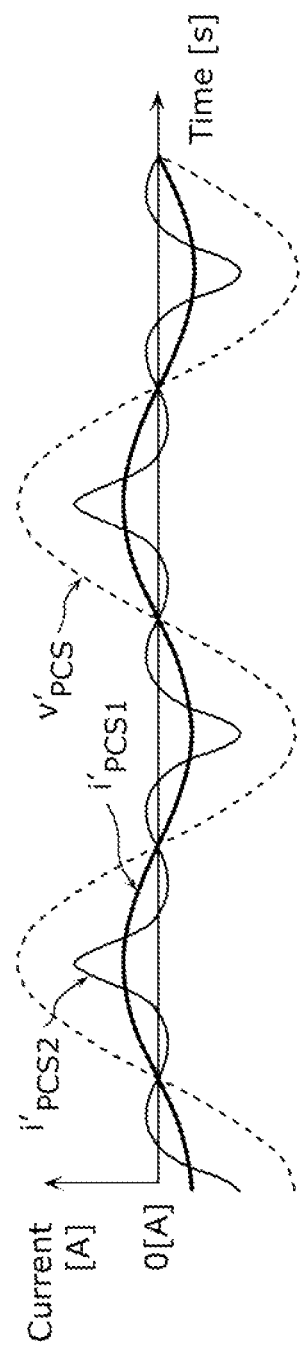

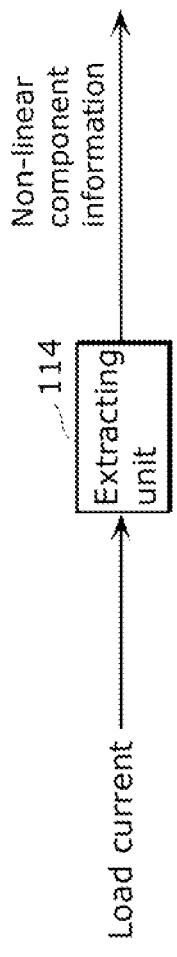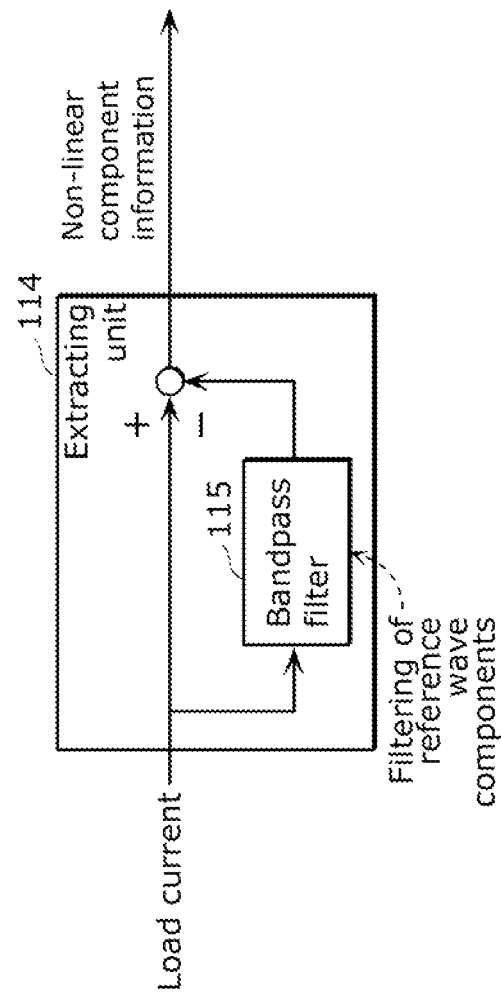

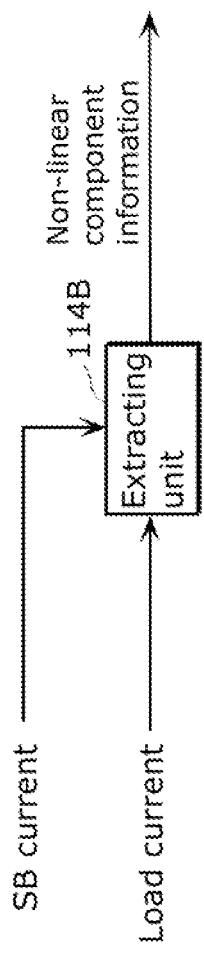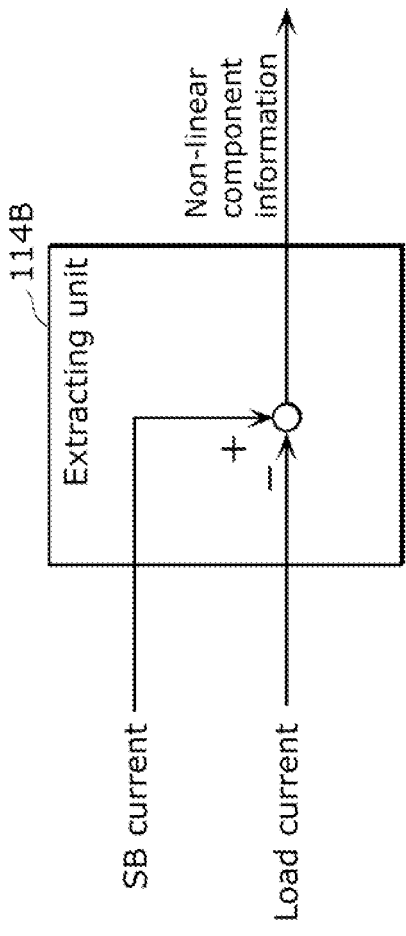

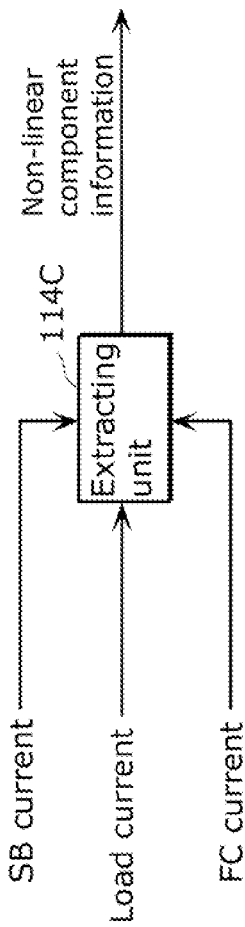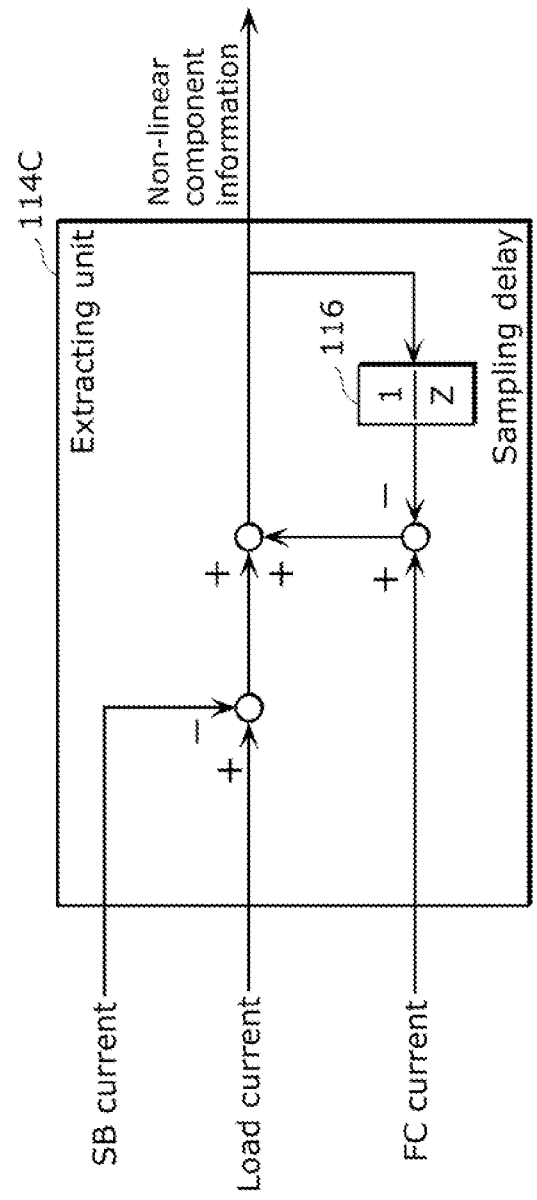

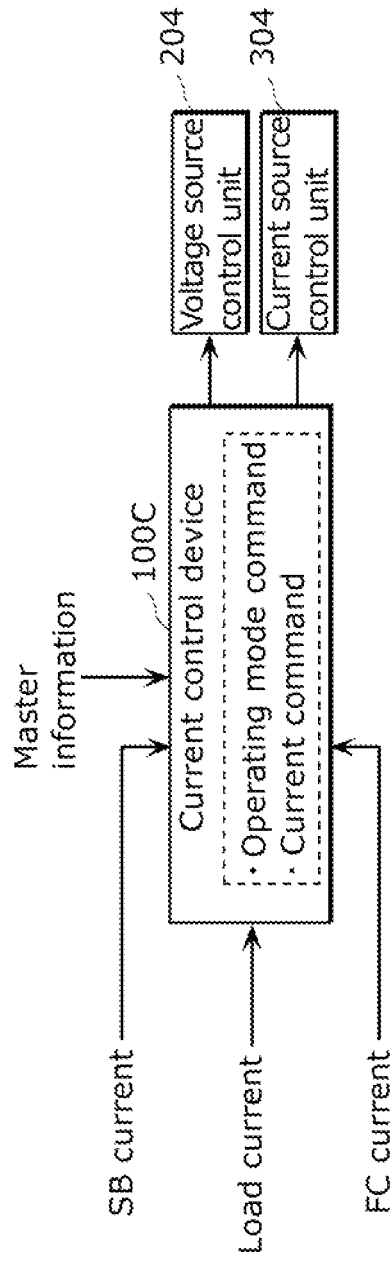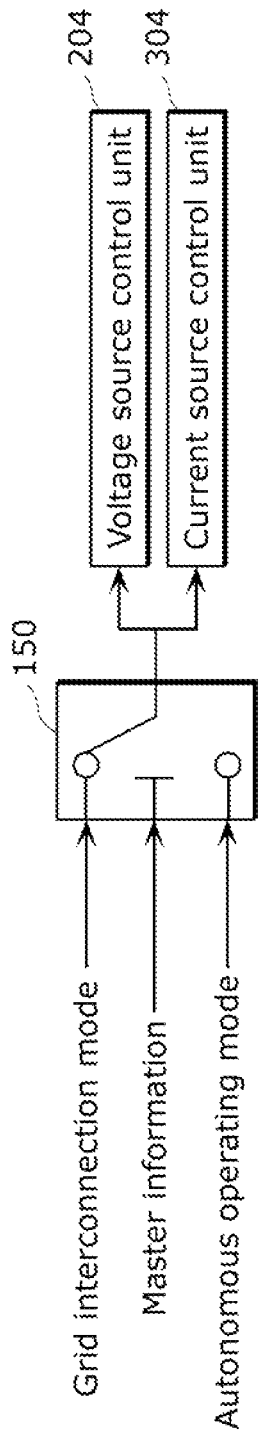

|  | Grid interconnection mode | Autonomous operating mode |
|---|---|---|
| Voltage source | Variable current source control | Voltage source control |
| Current source | Fixed current source control | Command value current source control |

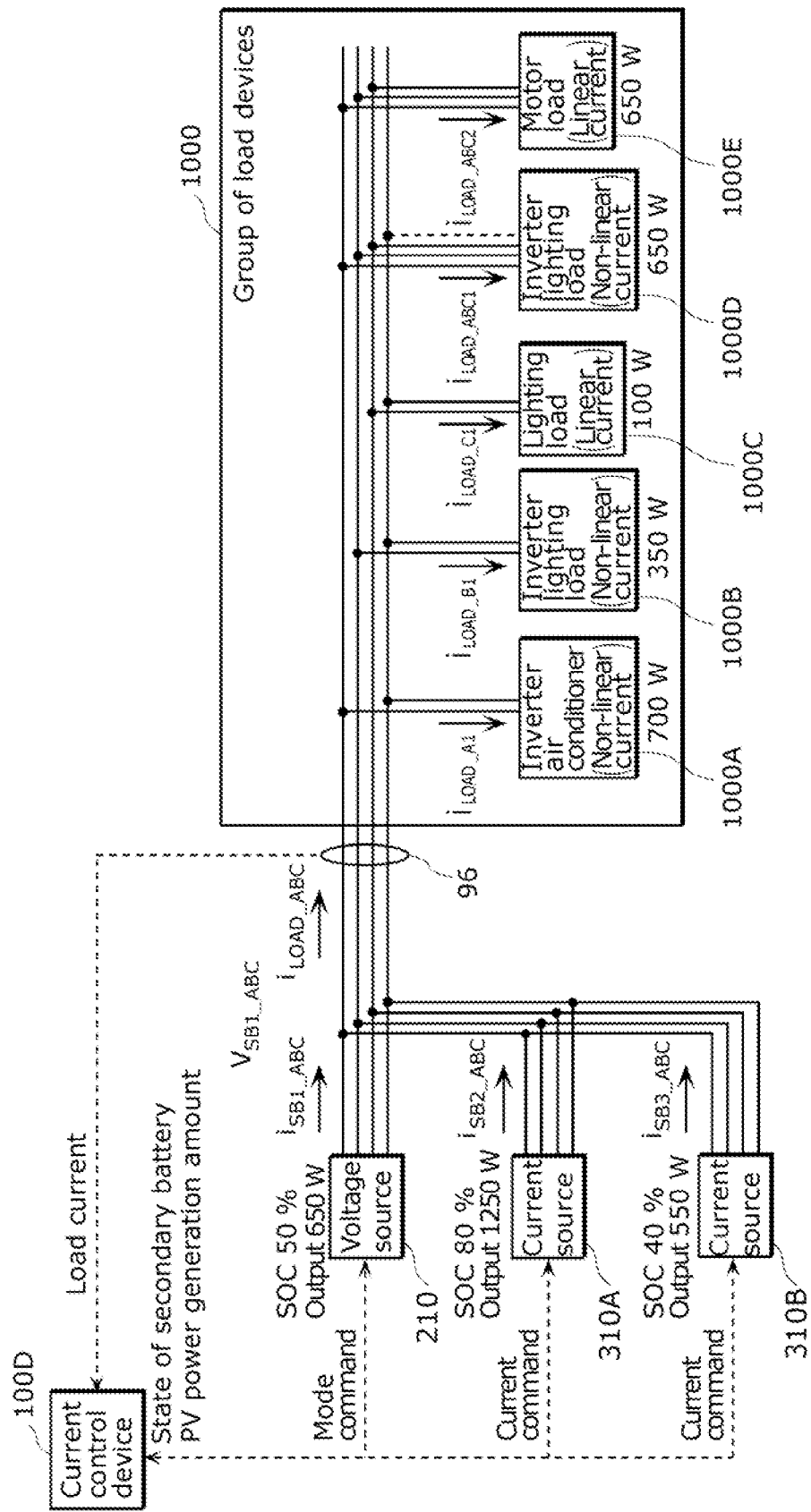

CURRENT CONTROL DEVICE, CURRENT CONTROL METHOD, AND CURRENT CONTROL SYSTEM

TECHNICAL FIELD

The present invention relates to current control devices and the like. In particular, the present invention relates to a current control device and the like which causes a load device to output current by controlling a current source and a voltage source.

BACKGROUND ART

An electric power supply system has been developed in which a power generation device such as a photovoltaic generation system or a fuel power generation system is provided for each consumer.

CITATION LIST

Non Patent Literature

[NPL 1]
"Guideline of Harmonics Reduction for Consumers who have High or Ultra-High Voltage Power Receiving Facilities", [online], enacted in January 2004, Nuclear and Industrial Safety Agency, [searched on Jul. 29, 2009], Internet <URL: http://www.nisa.meti.go.jp/oshirase/2004/files/160131oshirase.pdf>, p. 7

SUMMARY OF INVENTION

Technical Problem

However, the conventional technique has such a problem in that a voltage source provided for the consumer may output a distorted voltage waveform.

In view of this, the present invention has an object to provide a current control device and the like which is capable of reducing distortion of a voltage waveform output by a voltage source.

Solution to Problem

A current control device according to an aspect of the present invention is a current control device which supplies a current to a load device by controlling a current source and a voltage source, the current source including a first electric appliance, the voltage source including a second electric equipment. The current control device includes: an obtaining unit which obtains information indicating non-linear components included in a load current that is a current supplied to the load device; a determining unit which determines a first current that includes the non-linear components; and a notifying unit which notifies the current source of a command value to cause the current source to output the determined first current, the command value being for causing the current source to output the first current.

The present invention may be implemented not only as such a current control device, but also as a current control method including characteristic units included in the current control device as steps, or as a program causing a computer to execute such characteristic steps. Needless to say, such a program may be distributed over a recording medium such as a compact disc-read only memory (CD-ROM) or a transmission medium such as the Internet.

Furthermore, the present invention may be implemented as a semiconductor integrated circuit (LSI) which includes part or all of the functions of the current control device, or may be implemented as a current control system including the current control device.

Advantageous Effects of Invention

The present invention provides a current control device capable of reducing distortion of a voltage waveform output by a voltage source.

BRIEF DESCRIPTION OF DRAWINGS

[FIG. 1A]
FIG. 1A is a conceptual diagram showing a voltage source and a current source which supply power to load devices, according to a related technique of the present invention.
FIG. 1B shows waveforms of $i_{LOAD}$, $i_{LOAD1}$, and $i_{LOAD2}$ shown in FIG. 1A.
FIG. 1C shows waveforms of $i_{pcs1}$ and $i_{pcs2}$ shown in FIG. 1A.
[FIG. 2A]
FIG. 2A is a conceptual diagram of the case where a voltage source and a current source controlled by a current control device supply power to load devices, according to Embodiment 1, its variation, and Embodiment 2.
[FIG. 2B]
FIG. 2B shows waveforms of $i'_{LOAD}$, $I'_{LOAD1}$, and $i'_{LOAD2}$ shown in FIG. 2A.
[FIG. 2C]
FIG. 2C shows waveforms of $I'_{pcs1}$ and $I'_{pcs2}$ shown in FIG. 2A.
FIG. 3 is a configuration diagram of a current control system which includes a current control device according to Embodiment 1.
FIG. 4 is a functional block diagram of the current control device according to Embodiment 1.
FIG. 5 is a functional block diagram of the current control device according to Variation 1 of Embodiment 1.
[FIG. 6A]
FIG. 6A is a conceptual diagram showing input and output of an extracting unit according to Variation 1 of Embodiment 1.
[FIG. 6B]
FIG. 6B is a functional block diagram of the extracting unit according to Variation 1 of Embodiment 1.
FIG. 7 is a functional block diagram of a current control device according to Variation 2 of Embodiment 1.
FIG. 8A is a conceptual diagram showing an example of input and output of an extracting unit according to Variation 2 of Embodiment 1.
FIG. 8B is a diagram of an example of a functional block of the extracting unit according to Variation 2 of Embodiment 1.
[FIG. 9A]
FIG. 9A is a conceptual diagram showing an example of input and output of the extracting unit having another structure, according to Variation 2 of Embodiment 1.

[FIG. 9B]
FIG. 9B is a diagram of an example of a functional block of the extracting unit having another structure, according to Variation 2 of Embodiment 1.

[FIG. 10A]
FIG. 10A is a conceptual diagram showing an example of input and output of the extracting unit having another structure, according to Variation 2 of Embodiment 1.

[FIG. 10B]
FIG. 10B is a diagram of an example of a functional block of the extracting unit having another structure, according to Variation 2 of Embodiment 1.

FIG. 11 is a functional block diagram of a current control device according to Embodiment 2.

[FIG. 12A]
FIG. 12A is a conceptual diagram of input and output of the current control device according to Embodiment 2.

[FIG. 12B]
FIG. 12B is a conceptual diagram of a mode switching process performed by an operating mode determining unit according to Embodiment 2.

FIG. 13 is a diagram showing an example of control methods performed by the current control device in respective modes, according to Embodiment 2.

FIG. 14 is a flowchart of an overall process performed by the current control device according to Embodiment 1, its variations, and Embodiment 2.

FIG. 15 is a flowchart of an example of an output current determination process performed by a determining unit according to Embodiment 1, its variations, and Embodiment 2.

FIG. 16 is a flowchart of an example of another output current determination process performed by the determining unit according to Embodiment 1, its variations, and Embodiment 2.

FIG. 17 is a block diagram of a hardware configuration of a computer system which implements the current control device and the like according to Embodiment 1, its variations, and Embodiment 2.

[FIG. 18A]
FIG. 18A is a conceptual diagram of a current control system in which a voltage source and current sources which are controlled by a current control device supply power to load devices.

FIG. 18B shows waveforms of $i_{LOAD\_ABC}$, $i_{LOAD\_A1}$, $i_{LOAD\_B1}$, $i_{LOAD\_C1}$, $i_{LOAD\_ABC1}$, and $i_{LOAD\_ABC2}$ of the group of load devices shown in FIG. 18A.

FIG. 18C shows waveforms of voltage $V_{SB1\_ABC}$, current $i_{SB1\_ABC}$, $i_{SB2\_ABC}$, and $i_{SB3\_ABC}$ shown in FIG. 18A.

FIG. 19 is a configuration diagram of a current control system which includes the current control device according to Embodiment 3.

FIG. 20 is a flowchart of an overall process performed by the current control device according to Embodiment 3.

FIG. 21 is a flowchart of an example of an output current determination process performed by a determining unit according to Embodiment 3.

DESCRIPTION OF EMBODIMENTS

Figure 1B:
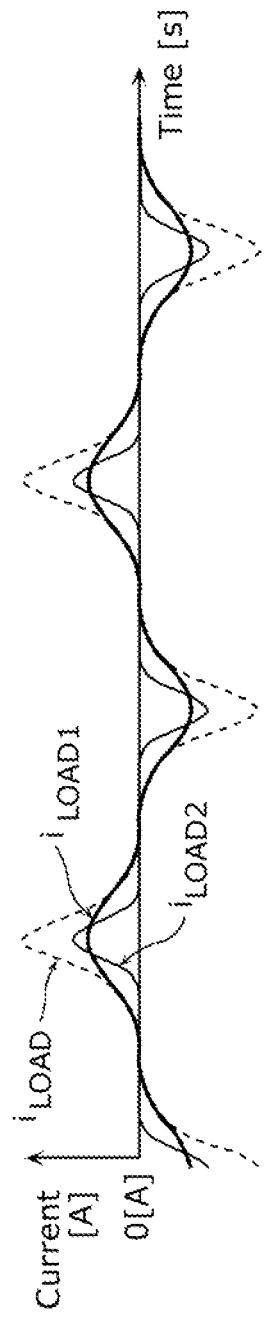
[FIG. 1B]

[Embodiment 1]
(Underlying Knowledge Forming Basis of the Present Invention)

In relation to the power supply system disclosed in the Background Art section, the inventors have found the following problem:

An electric power supply system has been developed in which a power generation device such as a photovoltaic generation system or a fuel power generation system is provided for each consumer. In this system, in the case where natural energy, such as a photovoltaic generation system, is used for a power generation device, the amount of power generated varies depending on time, weather, and the like. Furthermore, the amount of power consumed by a consumer also varies depending on daytime, night time, and the like. As a result, an inequality may arise between power supply from a power generation device and power demand from a consumer.

In view of this, a power supply system has been studied which uses an electric storage device or a power grid connected to a power generation device. In this case, an electric storage device is used for storing power generated by a power generation device. In the case where a shortage of the power supply by a power generation device occurs relative to the power demand from a consumer, the power stored in the electric storage device is supplied to the consumer. In the case where the power demand exceeds the amount of power stored in the electric storage device, the consumer purchases power from a power grid. Furthermore, the consumer is also capable of selling surplus power which flows back to the network.

Here, the power generation device is connected to a one-way DC/AC inverter (so called, a power conditioner) for converting DC current output from the power generation device into AC current having predetermined characteristics. The predetermined characteristics are specifically defined by the grid interconnection guideline (see NPL 1).

According to the guideline, a power conditioner connected to a power generation device needs to keep flow of harmonic current from a consumer to power grid at 5% or less. In order to achieve this, the power conditioner performs instantaneous current control. Hence, the power conditioner interconnected to the power grid operates as a current source which outputs sine wave. Furthermore, the electric storage device is connected to a bidirectional DC/AC inverter. In other words, the electric storage device and the one-way DC/AC inverter connected to the electric storage device operate as voltage sources for the current source.

However, the conventional technique has such a problem in that non-linear current that flows through a rectifier load provided for a consumer causes distortion of a voltage waveform of the voltage source.

Generally, a capacitor input type rectifier load (hereinafter, referred to as a rectifier load) is provided for each consumer. In the case where a consumer has a rectifier load, the waveform of current supplied to the rectifier load is non-linear. Hereinafter, current having a non-linear waveform is referred to as non-linear current. The non-linear current distorts voltage waveform of a voltage source. The distortion of the voltage waveform degrades power quality of the voltage source, which causes a failure in the load. Furthermore, the distortion of the voltage waveform reduces use efficiency of power generated by the power generation device.

For example, in the case where power generation and power consumption are localized as in a microgrid, it is desirable to supply power to a consumer only by an electric storage device and a power generation device without using a power grid as much as possible. However, disconnection of the electric storage device and the power generation device from the power grid increases the distortion of the voltage waveform of the voltage source caused by non-linear current supplied to a rectifier load.

Furthermore, for example, in the case of a three-phase four-wire power distribution system, a large number of electric appliances of low-voltage consumers are mainly single-phase. This may result in a load unbalanced state where groups of loads each having a different capacity are connected to respective phases. In this case, unbalanced current which flows through the power distribution system generates voltage unbalance. The generated voltage unbalance causes an overlay of DC components over voltage of another phase, causing a DC breaker for protecting load appliances and the like to operate, and may result in a power outage. In order to prevent such an incident from occurring, it is desirable to supply power stably without reducing quality of the voltage source even at the time of load unbalance.

In order to solve such a problem, a current control device according to an aspect of the present invention is a current control device which supplies a current to a load device by controlling a current source and a voltage source, the current source including a first electric appliance, the voltage source including a second electric equipment. The current control device includes: an obtaining unit which obtains information indicating non-linear components included in a load current that is a current supplied to the load device; a determining unit which determines a first current that includes the non-linear components; and a notifying unit which notifies the current source of a command value to cause the current source to output the determined first current, the command value being for causing the current source to output the first current.

With this, the current control device causes the current source to output current including non-linear components included in load current that is current supplied to the load device. Accordingly, it is possible to reduce non-linear components included in current output by the voltage source. As a result, it is possible to reduce distortion of the voltage waveform of the voltage source caused by the non-linear current supplied to the rectifier load.

More specifically, it may be that the load device includes: a first load device that is a resistance load; and a second load device that is a rectifier load, and that the obtaining unit includes: a detecting unit which detects a load current to be supplied to the second load device; and an extracting unit which obtains information indicating the non-linear components, by extracting the non-linear components from the load current detected by the detecting unit. It may be that the extracting unit extracts the non-linear components by subtracting, from the load current, a result obtained by applying a predetermined bandpass filter to the load current.

With this, in the case where a load device includes a resistance load and a rectifier load, the extracting unit performs filtering on reference waveform components included in the load current, using a bandpass filter. Accordingly, the extracting unit is capable of extracting the non-linear components included in the load current.

Furthermore, it may be that the load device includes: a first load device that is a resistance load; and a second load device that is a rectifier load, and the obtaining unit includes: a detecting unit which detects the load current to be supplied to the first load device and the second load device; an output value receiving unit which receives information indicating an output current output by at least one of the current source and the voltage source; and an extracting unit which obtains information indicating the non-linear components, by extracting the non-linear components from the load current, based on information indicating the load current and the information indicating the output current.

With this, the extracting unit is capable of extracting the non-linear components included in the load current, based on the output current value and the load current value output by at least one of the current source and the voltage source.

Furthermore, it may be that the determining unit determines the first current and thereby preferentially cause the current source to output a current corresponding to the non-linear components rather than the voltage source.

With this, the determining unit preferentially causes the current source to output current corresponding to the non-linear components included in the load current. As a result, it is possible to reduce distortion of the voltage waveform of the voltage source caused by the non-linear current.

Furthermore, it may be that in the case where the obtained load current is greater than rating of the current source, the determining unit determines a second current to be output by the voltage source, by subtracting the rating from the load current, and the notifying unit notifies the voltage source of a command value for causing the voltage source to output the second current.

With this, in the case where the output of the current source is insufficient for the required current, the determining unit is capable of causing the voltage source to supply a deficiency.

Furthermore, it may be that in the case where the load current is smaller than rating of the current source, the determining unit determines a value of a second current to be output by the voltage source as 0, and the notifying unit notifies the voltage source of a command value for causing the voltage source to output the second current.

With this, in the case where the load current is smaller than the rating of the current source, the determining unit is capable of causing the current source to output all the load current. In other words, the voltage source is not used for supplying load current. As a result, it is possible to reduce degradation of the second electric appliance included in the voltage source caused by the use of the second electric appliance.

Specifically, it may be that the second electric equipment is an electric storage device.

Furthermore, it may be that in the case where the load current is smaller than rating of the current source, the determining unit determines a third current as the rating, and determine a fourth current as a current obtained by subtracting the load current from the rating, and the notifying unit notifies the current source of a command value for causing the current source to output the third current, and notify the voltage source of a command value for causing the voltage source to charge the fourth current out of the third current.

With this, in the case where the load current is smaller than the rating of the current source, the current control device is capable of storing the surplus power into a secondary battery included in the voltage source. In particular, in the case where the first electric appliance included in the current source is a power generation device which is not capable of regulating output power, it is possible to increase use efficiency of the generated power by charging the secondary battery with surplus power.

Specifically, it may be that the first electric appliance is a fuel cell.

Furthermore, it may also be that the first electric appliance is a secondary battery.

Furthermore, it may be that the voltage source is a voltage source which outputs a three-phase AC voltage, the current source includes at least one current source which outputs a three-phase AC current, the obtaining unit obtains information indicating non-linear components included in each phase of the load current that is a three-phase AC current, and information indicating unbalanced components included in the load current, and the determining unit determines the first current that is a three-phase AC current, the first current including phases each of which includes the non-linear components of a corresponding phase of the load current obtained by the obtaining unit, and the first current including the unbalanced components obtained by the obtaining unit.

With this, it is also possible to reduce unbalanced components in addition to the non-linear components included in the voltage waveform of the voltage source. For example, in a three-phase power distribution line, the current control device causes the current source to output unbalanced components included in the unbalanced current supplied to load devices each having a different capacity and each connected to a different phase, as current having a different amplitude and a different waveform for each phase. As a result, it is possible to balance the current output by the current source. Hence, even in the case where groups of loads each having a different capacity are connected to respective phases, it is possible to reduce distortion of the voltage waveform of the voltage source caused by the unbalanced current.

Hereinafter, embodiments according to the present invention are described with reference to the accompanying Drawings. Each of the embodiments described below shows a general or specific example. The numerical values, shapes, structural elements, the arrangement and connection of the structural elements, steps, the processing order of the steps etc. shown in the following embodiments are mere examples, and therefore do not limit the scope of the present invention. The present invention is limited only by the appended Claims. Therefore, among the structural elements in the following embodiments, structural elements not recited in any one of the independent claims are not necessarily required to achieve the object of the present invention, but are described as preferable embodiments.

(Embodiment 1)

Next, a description is given of a current control device according to Embodiment 1 of the present invention.

First, referring to FIG. 1A to FIG. 1C, and FIG. 2A to FIG. 2C, descriptions are given of the problem to be solved by the present invention and the advantageous effects provided by a current control device 100 according to Embodiment 1.

FIG. 1A is a conceptual diagram showing a voltage source 810 and a current source 820 which supply electric power to load devices, according to a related technique of the present invention.

As shown in FIG. 1A, the voltage source 810 outputs current $i_{PCS1}$ and voltage $V_{PCS}$. The current source 820 outputs current $i_{PCS2}$.

The current output from the voltage source 810 and the current source 820 are supplied to the load devices, as $I_{LOAD}$. More specifically, $i_{LOAD1}$ is supplied to a load device 900A that is a resistance load. Furthermore, $i_{LOAD2}$ is supplied to a load device 900B that is a rectifier load.

FIG. 1B shows waveforms of the $i_{LOAD}$, $i_{LOAD1}$, and $i_{LOAD2}$ shown in FIG. 1A. The vertical axis represents magnitude of current [A], and the horizontal axis represents elapsed time [s].

As shown in FIG. 1B, the current $i_{LOAD2}$ supplied to the load device 900B serving as a rectifier load has a non-linear pattern. As a result, the current $i_{LOAD}$ supplied to the load devices 900A and 900B have a non-linear pattern.

Figure 1C:
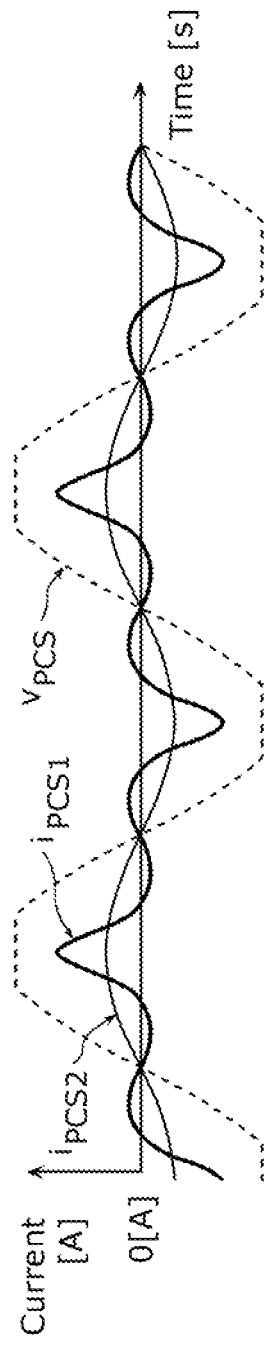
[FIG. 1C]

FIG. 1C shows the waveforms of $i_{PCS1}$ and $i_{PCS2}$ shown in FIG. 1A. The vertical axis represents magnitude of current [A], and the horizontal axis represents elapsed time [s]. Furthermore, for ease of description, the waveform of $V_{PCS}$ that is the voltage corresponding to $i_{PCS1}$ is also shown.

As shown in FIG. 1C, the current $i_{PCS2}$ output by the current source 820 according to the related technique has a sine wave pattern. On the other hand, the current $i_{PCS1}$ output by the voltage source 810 has a non-linear pattern. This is because $i_{PCS1}$ has the non-linear components of $i_{LOAD}$. As a result, the voltage $V_{PCS}$ of the voltage source 810 has a waveform with distorted peaks. This indicates that low quality power is being supplied to the load devices 900A and 900B. Hence, it is necessary to reduce distortion of the voltage waveform output from the voltage source.

FIG. 2A is a conceptual diagram showing a case where a voltage source 200 and a current source 300 controlled by the current control device 100 supply power to load devices, according to Embodiment 1.

As shown in FIG. 2A, the voltage source 200 outputs current $I'_{PCS1}$ and voltage $V'_{PCS}$. The current source 300 outputs current $I'_{PCS2}$.

The current output from the voltage source 200 and the current source 300 is supplied to the load devices 900A and 900B, as $I'_{LOAD}$. More specifically, $I'_{LOAD1}$ is supplied to the load device 900A. Furthermore, $i'_{LOAD2}$ is supplied to the load device 900B.

FIG. 2B shows waveforms of $i'_{LOAD}$, $i'_{LOAD1}$, and $i'_{LOAD2}$ shown in FIG. 2A. The vertical axis represents magnitude of current [A], and the horizontal axis represents elapsed time [s].

As shown in FIG. 2B, the current $i'_{LOAD2}$ supplied to the load device 900B serving as a rectifier load has a non-linear pattern. As a result, the current $i'_{LOAD}$ supplied to the load devices 900A and 900B have non-linear patterns.

FIG. 2C shows waveforms of $i'_{PCS1}$ and $i'_{PCS2}$ shown in FIG. 2A. The vertical axis represents magnitude of current [A], and the horizontal axis represents elapsed time [s]. Furthermore, for ease of description, the waveform of $V'_{PCS}$ that is the voltage corresponding to $I'_{PCS1}$ is also shown.

As shown in FIG. 2C, the current $i'_{PCS2}$ output from the current source 300 according to Embodiment 1 has a non-linear pattern. On the other hand, the current $i'_{PCS1}$ output from the voltage source 200 has a sine wave pattern. This is because $i'_{PCS2}$, instead of $i'_{PCS1}$, has the non-linear components included in $i'_{LOAD}$. As a result, the voltage $V'_{PCS}$ of the voltage source 200 has a sine wave pattern.

More specifically, regardless of the non-linear components included in $i_{LOAD}$, the current source 820 according to the related technique outputs AC current having a sine wave pattern which meets the grid interconnection guideline. On the other hand, the current control device 100 according to Embodiment 1 controls the current source 300 and the voltage source 200 such that the current source 300 preferentially outputs current having a waveform pattern corresponding to the non-linear components included in $i'_{LOAD}$. As a result, it is possible to reduce the distortion of the waveform of $V'_{PCS}$.

Figure 3:
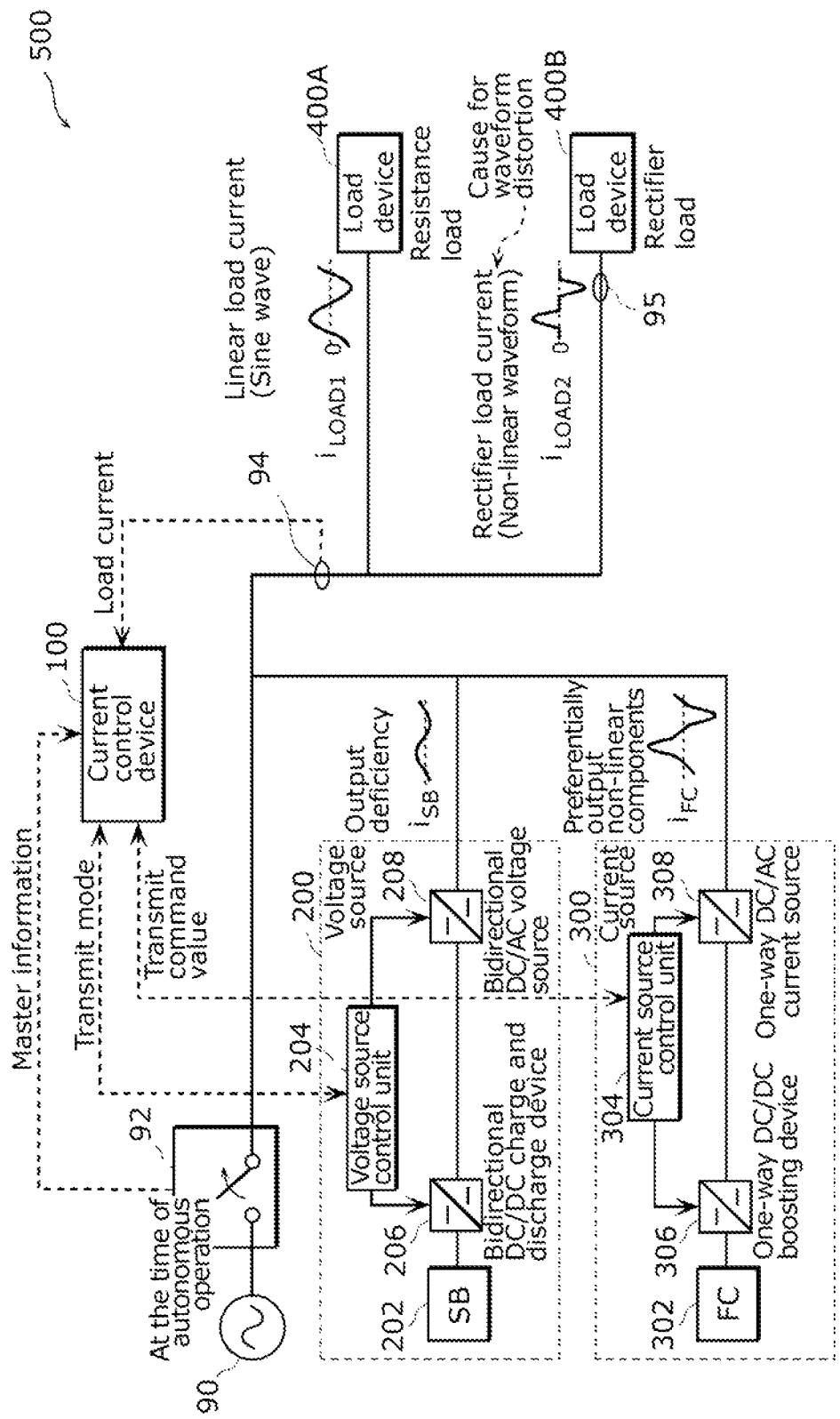
[FIG. 3]

Next, referring to FIG. 3, a description is given of a structure of a current control system which includes the current control device 100 according to Embodiment 1.

FIG. 3 is a diagram of a structure of a current control system 500 which includes the current control device 100 according to Embodiment 1. As shown in FIG. 3, the current control system 500 includes: the current control device 100; the voltage source 200; the current source 300; a load device 400A; a load device 400B; a grid power supply 90; a master breaker 92; and a current sensor 94. In the following description, unless specifically described, it is assumed that the current control system 500 operates in a state where the current control system 500 is disconnected from the grid power supply 90 by the master breaker 92 (referred to as an autonomous operating mode).

The current control device 100 is a current control device which supplies current to the load devices 400A and 400B, by controlling the voltage source 200 and the current source 300.

The voltage source 200 includes: a secondary battery (hereinafter, may also be referred to as SB) 202; a voltage source control unit 204; a bidirectional DC/DC charging and discharging device 206; and, a bidirectional DC/AC voltage source 208.

The secondary battery 202 may be any type of secondary battery, such as a lithium ion battery, a lead battery, a sodium-sulfur battery, or a nickel-cadmium battery. Hereinafter, the secondary battery 202 may also be referred to as a second electric appliance.

The voltage source control unit 204 controls the bidirectional DC/DC charging and discharging device 206 and the bidirectional DC/AC voltage source 208, according to a command value obtained from the current control device 100. More specifically, the voltage source control unit 204 causes the secondary battery 202 to discharge or charge current according to the command value.

The bidirectional DC/DC charging and discharging device 206 is a conversion device between DC voltages. The bidirectional DC/DC charging and discharging device 206 converts voltage at the time of discharging or charging of the secondary battery 202.

The bidirectional DC/AC voltage source 208 converts DC current into AC current $i_{SB}$ and outputs the converted current, at the time of discharging of the secondary battery 202.

The current source 300 includes: a fuel cell (hereinafter, may also be referred to as FC) 302; a current source control unit 304; a one-way DC/DC boosting device 306; and a one-way DC/AC current source 308.

The fuel cell 302 may be any type of fuel cell, such as a polymer electrolyte fuel cell, a phosphoric acid fuel cell, a molten carbonate fuel cell, a solid oxide fuel cell, or the like. Hereinafter, the fuel cell 302 may also be referred to as a first electric appliance.

The current source control unit 304 controls the one-way DC/DC boosting device 306 and the one-way DC/AC current source 308, according to a command value obtained from the current control device 100. More specifically, the current source control unit 304 controls the one-way DC/DC boosting device 306 such that the level of voltage output from the fuel cell 302 increases. Subsequently, the current source control unit 304 controls the one-way DC/AC current source 308 such that AC current $i_{FC}$ is output.

The load device 400A is a resistance load provided for a consumer. The load device 400A receives a supply of the AC current $i_{LOAD1}$. Examples of the load device 400A include an incandescent light.

The load device 400B is a rectifier load provided for a consumer. The load device 400B receives a supply of the AC current $i_{LOAD2}$. Examples of the load device 400B include an electric appliance having an AC adaptor.

The grid power supply 90 is a power supply connected to the power grid.

The master breaker 92 is a switching device which switches the connection state of an electric power receiving facility of a consumer to the grid power supply 90 between ON and OFF. The state where an electric power receiving facility of a consumer and the grid power supply 90 are connected by the master breaker 92 is referred to as a grid interconnection mode. Furthermore, the state where an electric power receiving facility of a consumer is disconnected from the grid power supply 90 is referred to as an autonomous operating mode as described above.

The current control device 100 changes a method of controlling the voltage source 200 and the current source 300, based on master information obtained from the master breaker 92. As described above, in Embodiment 1, it is assumed that the current control device 100C operates in the autonomous operating mode.

The current sensor 94 is a current sensor which measures current supplied to the load device 400A and the load device 400B. The current sensor 94 is attached to, for example, a distribution line of a consumer. The current sensor 94 outputs the measured current value to the current control device 100 via a wired or wireless communication network. The current sensor does not have to be positioned at a point shown as the current sensor 94. For example, the current sensor may be positioned at a point shown as the current sensor 95.

Figure 4:
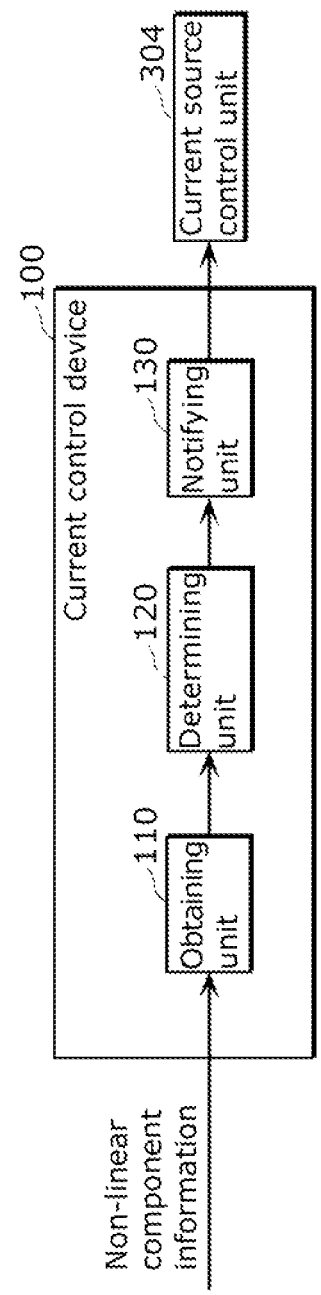
[FIG. 4]

FIG. 4 is a functional block of the current control device 100 according to Embodiment 1.

As shown in FIG. 4, the current control device 100 includes an obtaining unit 110, a determining unit 120, and a notifying unit 130.

The obtaining unit 110 obtains information indicating non-linear components included in load current that is current supplied to a load device. The obtaining unit 110 may use any methods for obtaining the non-linear components. For example, it may be that after a detecting device outside the current control device 100 detects non-linear components included in load current, and the detecting device transmits information indicating the detected non-linear components to the obtaining unit 110.

The determining unit 120 determines a first current such that the first current includes the non-linear components obtained by the obtaining unit 110. Specifically, the determining unit 120 determines current to be output by the current source 300 to preferentially cause the current source 300 to output current corresponding to the non-linear components rather than the voltage source 200. Hereinafter, the current output by the current source 300 is referred to as a first current. In addition, the current output by the voltage source 200 is referred to as a second current. Furthermore, the term "determining current" specifically refers to determining the waveform of the current output by the voltage source 200 and the current source 300. More specifically, the values of amplitude and phase of current waveforms are determined. It may also be that parameters are determined which are included in an approximate expression where amplitude and phase values are modeled.

The notifying unit 130 notifies the current source control unit 304 included in the current source 300 of a command value for causing the current source 300 to output the determined first current. The current source control unit 304 causes the current source 300 to output the first current according to the command value.

As described above, the current control device 100 according to Embodiment 1 controls the current source 300 and the voltage source 200 such that the current source 300 preferentially outputs current having a waveform pattern corresponding to the non-linear components included in load current. As a result, it is possible to reduce distortion of the voltage waveform output by the current source 300. Hence, it is possible to reduce distortion of the voltage waveform of the voltage source 200 caused by the non-linear current supplied to the load device 400B that is a rectifier load. Furthermore, it is possible to increase use efficiency of the power generated by the fuel cell 302. Furthermore, it is possible to reduce degradation in quality of grid power supply also in the case where the voltage source 200 and the current source 300 are interconnected to the grid.

(Variation 1)

Next, a description is given of Variation 1 of Embodiment 1 that is an example where the obtaining unit obtains information indicating non-linear components included in load current, from the load current supplied to the load device 400B.

Figure 5:
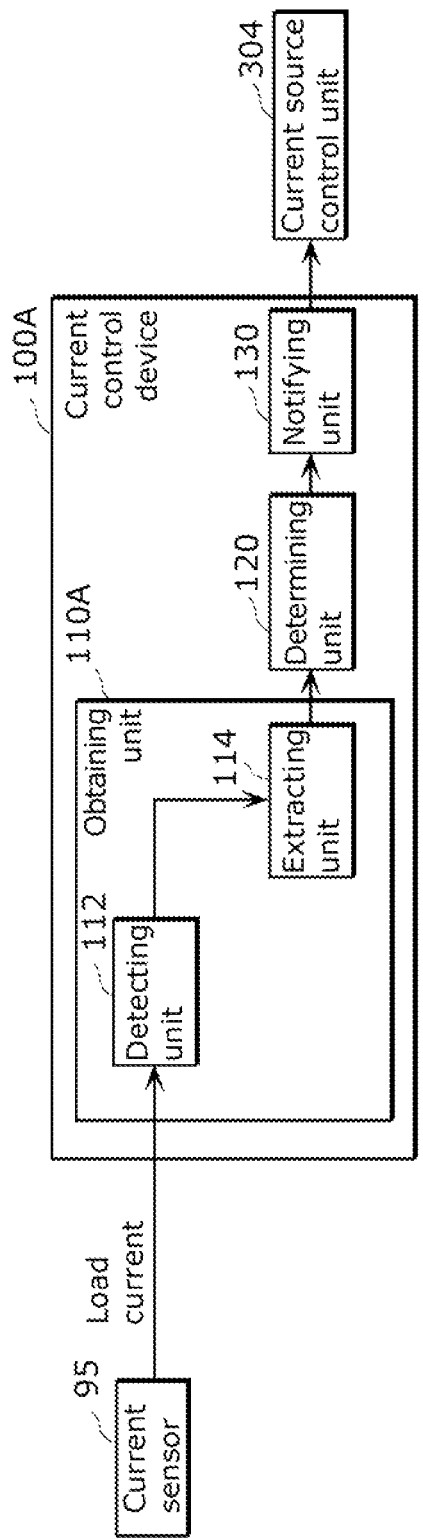
[FIG. 5]

FIG. 5 is a functional block of the current control device 100A according to Variation 1.

As shown in FIG. 5, the current control device 100A includes an obtaining unit 110A, a determining unit 120, and a notifying unit 130. The elements same as those included in the current control device 100 according to Embodiment 1 shown in FIG. 4 are identified with the same referential numerals, and their detailed descriptions are not given. In the following description, the load device 400A that is a resistance load is also referred to as a first load device. The load device 400B that is a rectifier load is also referred to as a second load device.

As shown in FIG. 5, the obtaining unit 100A includes a detecting unit 112 and an extracting unit 114.

The detecting unit 112 detects load current supplied to the second load device. For example, referring to FIG. 3 again, a current sensor 95 is placed just before the load device 400B. The current sensor 95 is capable of directly measuring $i_{LOAD2}$. Accordingly, the detecting unit 112 is capable of detecting load current supplied to the load device 400B, by detecting $i_{LOAD2}$ measured by the current sensor 95.

The extracting unit 114 obtains information indicating non-linear components by extracting the non-linear components from the load current detected by the detecting unit 112. Specifically, the extracting unit 114 extracts the non-linear components by subtracting, from the load current detected by the detecting unit 112, a result obtained by applying a predetermined bandpass filter to the load current. The bandpass filter may be implemented as an analog circuit or as a digital filter. The characteristics of the filter are defined in advance in accordance with the specification of the current control system 500. For example, referring to FIG. 2B again, the bandpass filter may be the one which allows a frequency domain corresponding to a reference wave that is sine wave components included in $I'_{LOAD2}$ to pass.

FIG. 6A is a conceptual diagram showing input and output of the extracting unit 114. The extracting unit 114 which have obtained the load current outputs information indicating non-linear components included in the load current.

FIG. 6B is a functional block of the extracting unit 114. As shown in FIG. 6B, the extracting unit 114 applies a bandpass filter 115 to the obtained load current. Subsequently, the extracting unit 114 extracts information indicating the non-linear components, by subtracting, from the obtained load current, the output of the bandpass filter 115.

According to Variation 1 described above, the current control device 100A measures the load current supplied to the load device 400B, using a current sensor. Furthermore, the current control device 100A obtains the non-linear components from the measured load current. Accordingly, the current control device 100A is capable of controlling the voltage source 200 and the current source 300 such that distortion included in the waveforms of the voltage source 200 is reduced. In other words, it is possible to stable current output by the voltage source 200.

(Variation 2)

Next, a description is given of Variation 2 of Embodiment 1 that is an example where an obtaining unit obtains information indicating non-linear components included in load current, from the load current supplied to the load device 400A and the load device 400B and the current output by at least one of the voltage source 200 and the current source 300.

Figure 7:
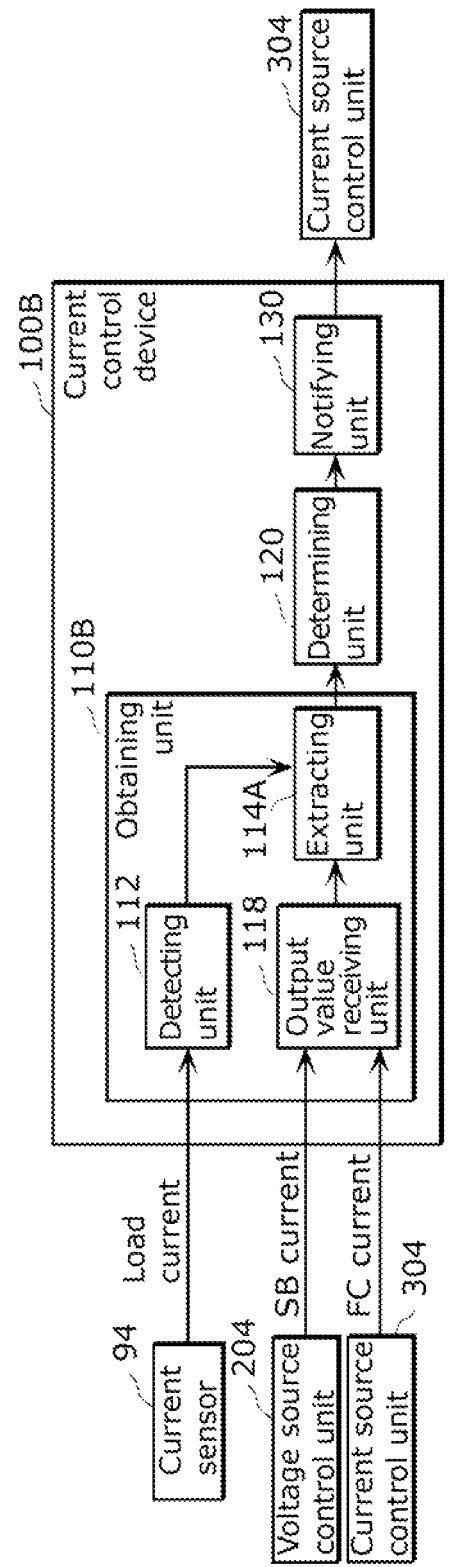
[FIG. 7]

FIG. 7 is a functional block of a current control device 100B according to Variation 2.

As shown in FIG. 7, the current control device 100B includes an obtaining unit 110B, a determining unit 120, and a notifying unit 130. The elements same as those included in the current control device 100 according to Embodiment 1 shown in FIG. 4 are identified with the same referential numerals, and their detailed descriptions are not given.

The obtaining unit 110B includes a detecting unit 112, an extracting unit 114A, and an output value receiving unit 118.

The detecting unit 112 detects load current supplied to the first load device and the second load device. For example, referring to FIG. 3 again, the detecting unit 112 obtains output from a current sensor positioned at a point shown as the current sensor 94.

The output value receiving unit 118 receives information indicating the output current output by at least one of the current source 300 and the voltage source 200. Specifically, the output value receiving unit 118 may receive, from the voltage source control unit 204, information indicating the output current output by the voltage source 200. Hereinafter, the information indicating the output current output by the voltage source 200 may also referred to as SB current. It may also be that output value receiving unit 118 receive, from the current source control unit 304, the information indicating the output current output by the current source 300. Hereinafter, the information indicating the output current output by the current source 300 may also referred to as FC current.

The extracting unit 114A obtains information indicating non-linear components, by extracting the non-linear components from load current, based on the load current and at least one of the SB current and the FC current.

Figure 8A:
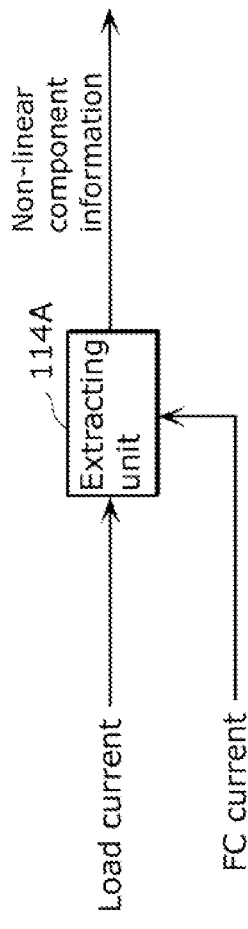
[FIG. 8A]

FIG. 8A shows an example of input and output of the extracting unit 114A. The extracting unit 114A obtains the FC current and load current, and outputs information indicating the non-linear components included in the load current.

Figure 8B:
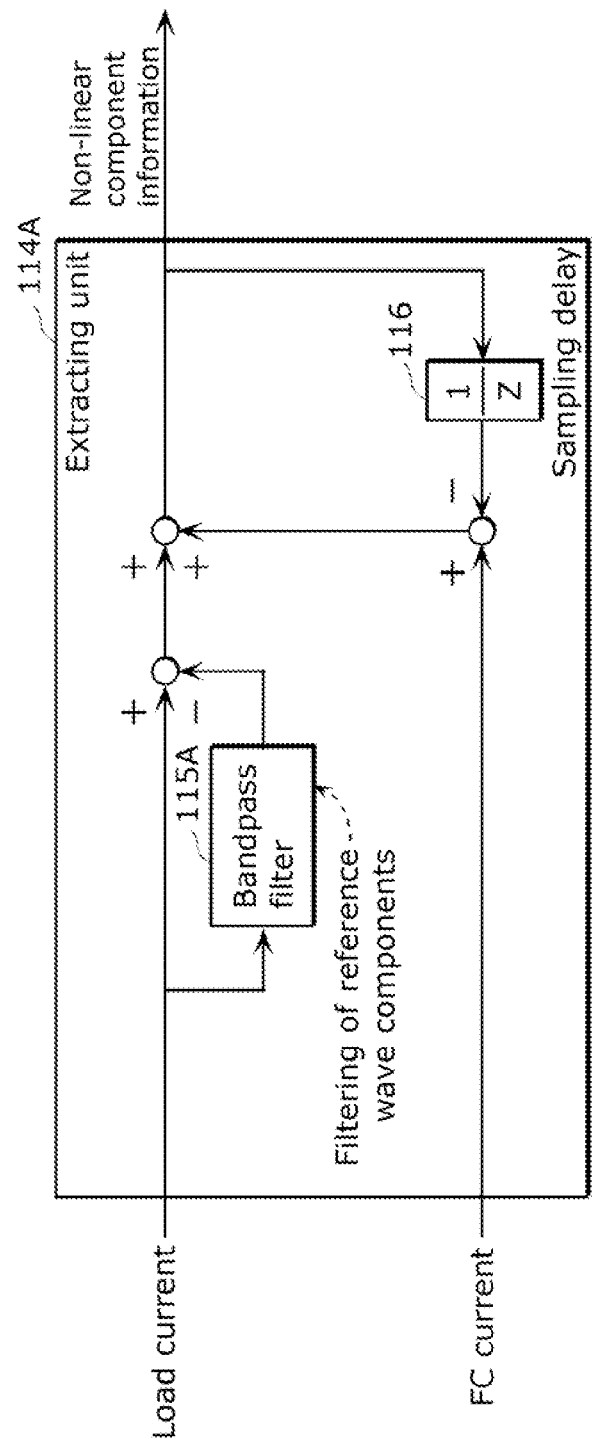
[FIG. 8B]

FIG. 8B is an example of a functional block of the extracting unit 114A. As shown in FIG. 8B, the extracting unit 114A applies a bandpass filter 115A to the obtained load current. The extracting unit 114A then subtracts the output of the bandpass filter 115A from the obtained load current. For the purpose of description, the value obtained by the subtraction is referred to as a filter difference value. For example, referring to FIG. 2B again, the bandpass filter 115A may be the one which allows a frequency domain corresponding to a reference waveform that is sine wave components included in $I'_{LOAD}$ to pass.

Furthermore, the extracting unit 114A includes a feedback loop as shown in FIG. 8B. Specifically, the extracting unit 114A delays information indicating the non-linear components that is an output of the extracting unit 114A by one sampling using an element 116. The extracting unit 114A then subtracts, from the FC current, the output of preceding sampling provided by the element 116. For the purpose of description, the value obtained by the subtraction is referred to as a sampling difference value.

The extracting unit 114A then sums the filter difference value and the sampling difference value, to output as information indicating the non-linear components included in the load current.

FIG. 9A shows an example of input and output of the extracting unit 114B having another structure. The extracting unit 114B obtains the SB current and load current, and outputs information indicating non-linear components included in the load current.

FIG. 9B is an example of a functional block of the extracting unit 114B. As shown in FIG. 9B, the extracting unit 114B subtracts load current from the obtained SB current. The extracting unit 114B then outputs the resultant value as information indicating the non-linear components included in the load current.

FIG. 10A shows an example of input and output of an extracting unit 114C having another structure. The extracting unit 114C obtains SB current, FC current, and load current, and outputs information indicating non-linear components included in the load current.

FIG. 10B is an example of a functional block of the extracting unit 114C. As shown in FIG. 10B, the extracting unit 114C includes a feedback loop. Specifically, the extracting unit 114C delays information indicating the non-linear components that is an output of the extracting unit 114C by one sampling using an element 116. The extracting unit 114C then subtracts, from the FC current, the output of preceding sampling provided by the element 116. In the same manner as in the description of FIG. 8, the value obtained by the subtraction here is referred to as a sampling difference value.

Furthermore, the extracting unit 114C subtracts the SB current from the obtained load current. Furthermore, the extracting unit 114C sums the value obtained by subtracting the SB current from the load current and the sampling difference value. The extracting unit 114C outputs the sum value as information indicating the non-linear components included in the load current.

In the feedback loops shown in FIG. 8B and FIG. 10B, the extracting unit may feedback a current command value determined by the determining unit 120 and notified by the notifying unit 130 to the current source control unit 304, instead of the information indicating the non-linear components.

As described above, the extracting unit included in the current control device 100B according to Variation 2 may have various configuration. Furthermore, the current control device 100B may obtain information indicating the non-linear components included in load current.

(Embodiment 2)

In the descriptions above of the current control device 100, the current control device 100A, and the current control device 100B according to Embodiment 1, it is assumed that the current control devices operate in an autonomous operating mode where the devices are disconnected from the grid power supply 90. On the other hand, a current control device 100C according to Embodiment 2 is capable of performing processing according to the switching by the master breaker 92 between an autonomous operating mode and a grid interconnection mode.

Figure 11:
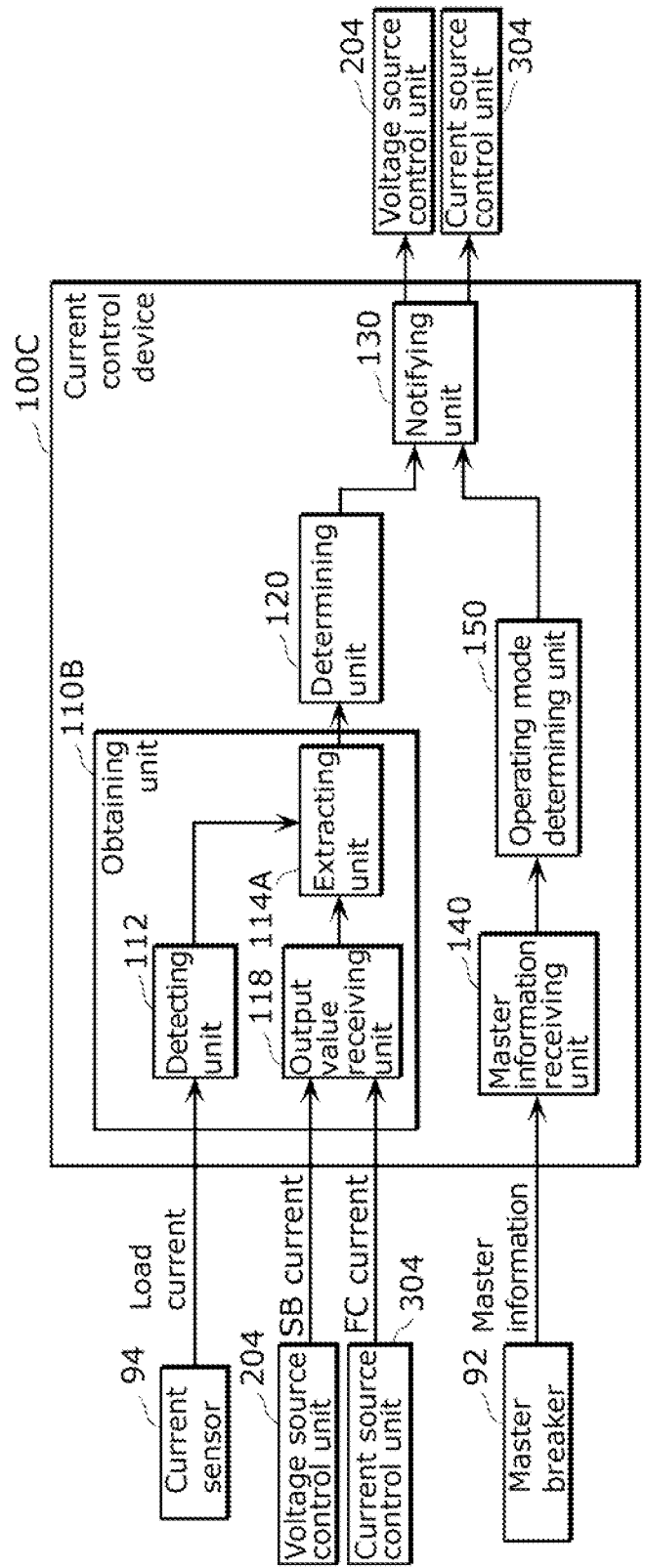
[FIG. 11]

FIG. 11 is a functional block of the current control device 100C according to Embodiment 2.

As shown in FIG. 11, the current control device 100C includes an obtaining unit 110B, a determining unit 120, a notifying unit 130, a master information receiving unit 140, and an operating mode determining unit 150. The elements same as those described in Embodiment 1 are identified with the same referential numerals, and their detailed descriptions are not given.

The master information receiving unit 140 obtains, from the master breaker 92, master information indicating the operating mode of the current control device 100C. The master information refers to information indicating one of the grid interconnection mode or the autonomous operating mode as an operating mode of the current control device 100C.

The operating mode determining unit 150 determines the operating mode of the current control device 100C according to the master information.

FIG. 12A shows input and output of the current control device 100C according to Embodiment 2. As shown in FIG. 12A, the current control device 100C which have received SB current, FC current, load current and master information outputs a command value to the voltage source control unit 204 and the current source control unit 304.

FIG. 12B is a conceptual diagram of mode switching process performed by the operating mode determining unit 150 according to Embodiment 2. Upon receipt of the master information, the operating mode determining unit 150 selects one of the grid interconnection mode and the autonomous operating mode. The operating mode determining unit 150 then notifies the voltage source control unit 204 and the current source control unit 304 of a command value that is different depending on the determined mode.

Figures 13, 14:
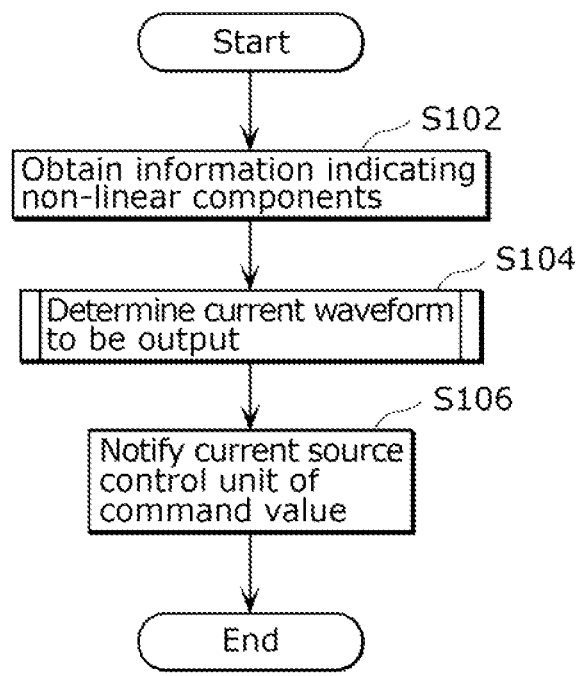
[FIG. 13]
[FIG. 14]

FIG. 13 shows an example of control methods for each mode performed by the current control device 100C according to Embodiment 2. As described above, in the autonomous operating mode, the current control device 100C transmits a command value to the voltage source control unit 204 to cause the voltage source 200 to output stable sine wave. This is called voltage source control. Furthermore, the current control device 100C transmits a command value to the current source control unit 304 to cause the current source 300 to output non-linear current according to the command value. This is called command value current source control.

On the other hand, in the grid interconnection mode, the current control device 100C is capable of using the grid power supply 90 as a voltage source. Furthermore, the current control device 100C is required to control the voltage source 200 and the current source 300 in accordance with the grid interconnection guideline. Accordingly, the current control device 100C performs control such that both the voltage source 200 and the current source 300 operate as current sources. In Embodiment 2, the current source 300 includes a fuel cell 302; and thus, the current control device 100C transmits a command value to the current source control unit 304 to cause the current source 300 to output current having a constant amplitude. This is called fixed current source control. Furthermore, since the voltage source 200 include a secondary battery 202, the current control device 100C transmits a command value to the voltage source control unit 204 to cause the voltage source 200 to output current having variable amplitude. This is called variable current source control.

According to the current control device 100C according to Embodiment 2, it is possible to perform appropriate current control depending on the connection state, even in the case where the master breaker 92 changes the connection state of the current control device 100C to the grid power supply 90.

In the case where the obtained load current is greater than the rating of the current source 300, the determining unit 120 according to Embodiment 1, its variation, and Embodiment 2 may determine second current to be output from the voltage source 200 by subtracting the rating from the load current. Here, the notifying unit 130 notifies the voltage source 200 of a command value for causing the voltage source 200 to output the current determined by the determining unit 120. In the case where the first current determined by the determining unit 120 is greater than the rating of the current source 300, the determining unit 120 may determine second current to be output from the voltage source 200 by subtracting the rating from the first current.

Furthermore, in the case where the load current is smaller than the rating of the current source 300, the determining unit 120 may determine the current value to be output from the voltage source 200 as 0. In other words, the current control device 100 may control the voltage source 200 such that no current is output. Here, the notifying unit 130 notifies the voltage source 200 of a command value for causing the voltage source 200 to output the current having a value 0. The determining unit 120 may control the voltage source 200 such that no current is output, by not notifying the voltage source 200 of a command value. Furthermore, in the case where the first current is smaller than the rating of the current source 300, the determining unit 120 may determine the current to be output from the voltage source 200 as 0.

In the case where the load current is smaller than the rating of the current source 300, the determining unit 120 may determine third current as the rating, and determine fourth current as current obtained by subtracting the load current from the rating. Here, the notifying unit 130 notifies the current source 300 of a command value for causing the current source 300 to output the third current. Furthermore, the notifying unit 130 notifies the voltage source 200 of a command value for causing the voltage source 200 to charge the fourth current out of the third current output by the current source 300. In the case where the first current is smaller than the rating of the current source 300, the determining unit 120 may determine the third current as the rating, and determine the fourth current as current obtained by subtracting the first current from the rating.

Figure 15:
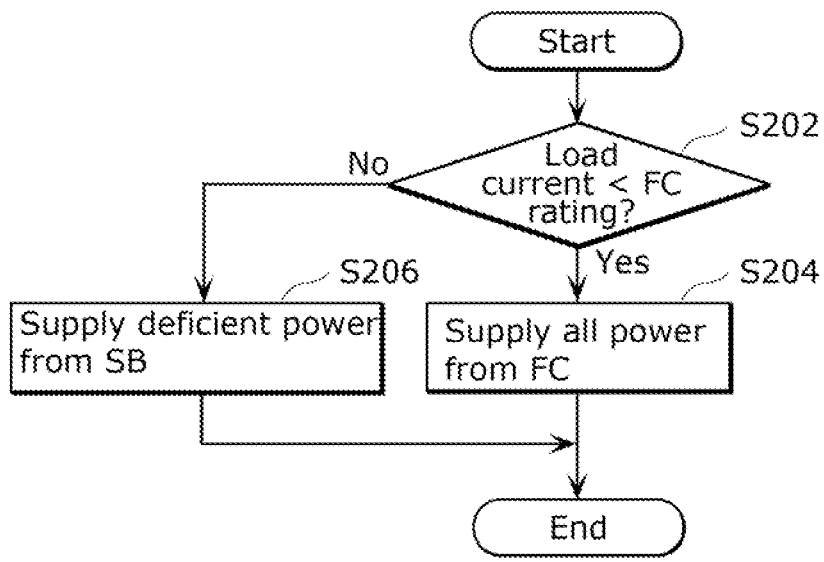
[FIG. 15]
Figure 16:
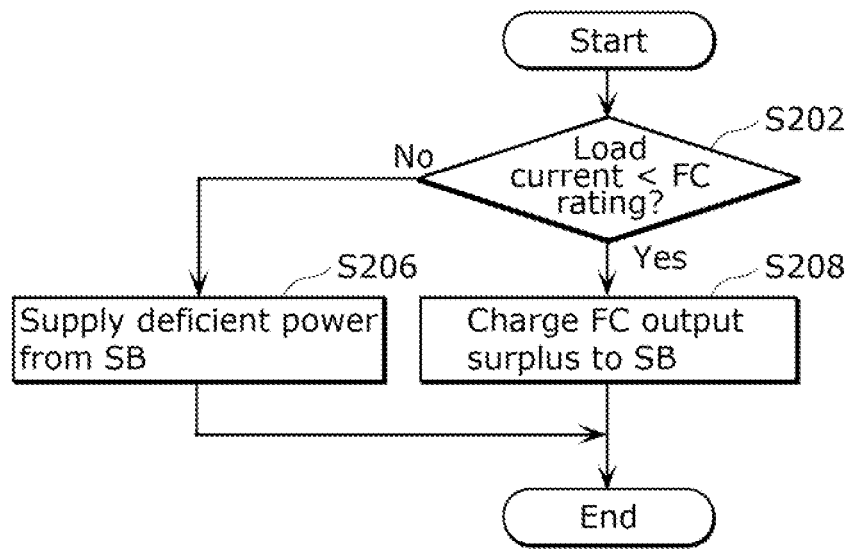
[FIG. 16]

Next, referring to FIG. 14 to FIG. 16, descriptions are given of the flow of processes performed by the current control device according to Embodiment 1, its variations, and Embodiment 2.

FIG. 14 is a flowchart of an overall process performed by the current control device according to Embodiment 1, its variations, and Embodiment 2.

First, the obtaining unit according to Embodiment 1, its variations, and Embodiment 2 obtains information indicating non-linear components (S102).

Next, the determining unit 120 according to Embodiment 1, its variations, and Embodiment 2 determines current waveform of the first current output by the current source 300 (S104). The output current determining process will be described later with reference to FIG. 15 and FIG. 16.

The notifying unit 130 according to Embodiment 1, its variations, and Embodiment 2 then notifies the current source control unit 304 of a command value for causing the current source 300 to output the determined first current (S106).

Next, referring to FIG. 15 and FIG. 16, a description is given of the output current determining process performed by the determining unit 120 according to Embodiment 1, its variations, and Embodiment 2.

FIG. 15 is a flowchart of an example of the output current determining process (S104 in FIG. 14) performed by the determining unit 120. Here, it is assumed that the fuel cell 302 included in the current source 300 includes a function of changing the power output level.

Referring to FIG. 15, first, the determining unit 120 determines whether load current is smaller than the rating of the fuel cell 302 of the current source 300 (hereinafter, also referred to as FC rating) (S202).

When the load current is smaller than the FC rating (Yes in S202), the determining unit 120 determines the output current such that all the power supply to the load device is performed by the fuel cell 302 (S204). In other words, the determining unit 120 determines the first current so as to include non-linear components, and determines the second current level to be output by the voltage source 200 as 0.

On the other hand, when the load current is greater than or equal to the FC rating (No in S202), it means that the output of the fuel cell 302 of the current source 300 is insufficient for the current supplied to the load device. Hence, the determining unit 120 first determines the first current such that the current source 300 preferentially outputs current. Subsequently, the determining unit 120 determines the second current such that the voltage source 200 outputs a deficiency (S206).

FIG. 16 is a flowchart of another example of the output current determining process (S104 in FIG. 14) performed by the determining unit 120. Here, it is assumed that the fuel cell 302 of the current source 300 does not have a function of changing the output power level. The steps same as those shown in FIG. 15 are identified with the same referential numerals, and their detailed descriptions are not given.

In the case where the determining unit 120 determines in Step S202 that the load current is smaller than the FC rating (Yes in S202), the determining unit 120 determines output current such that a surplus that is not supplied to the load device out of the current output by the fuel cell 302 of the current source 300 is charged to the secondary battery 202 of the voltage source 200 (S208).

In Step S202 in FIG. 15 and FIG. 16, the determining unit 120 compares the load current with the FC rating. However, the determining unit 120 may use the rating output of the current source 300, instead of the FC rating. Furthermore, the determining unit 120 may use the first current determined by the determining unit 120, instead of the load current.

In Embodiment 1, its variations, and Embodiment 2, the current source 300 may be, instead of the fuel cell 302, any power generation device such as a photovoltaic generation system, a wind generator system, or a cogeneration system.

Furthermore, in Embodiment 1, descriptions have been given on the assumption that power is supplied to load devices, that are the load device 400A serving as a resistance load and the load device 400B serving as a rectifier load. However, the load device may be only the rectifier load.

Furthermore, in Embodiment 1, its variations, and Embodiment 2, the current control device may be provided inside the current source 300 or the voltage source 200.

The current control devices 100, 100A, 100B, and 100C, and a current control system 500 described in Embodiment 1, its variations, and Embodiment 2, may also be implemented by a computer. Hereinafter, the current control devices 100, 100A, 100B, and 100C, and the current control system 500 will be collectively referred to as the current control device 100 etc.

Figure 17:
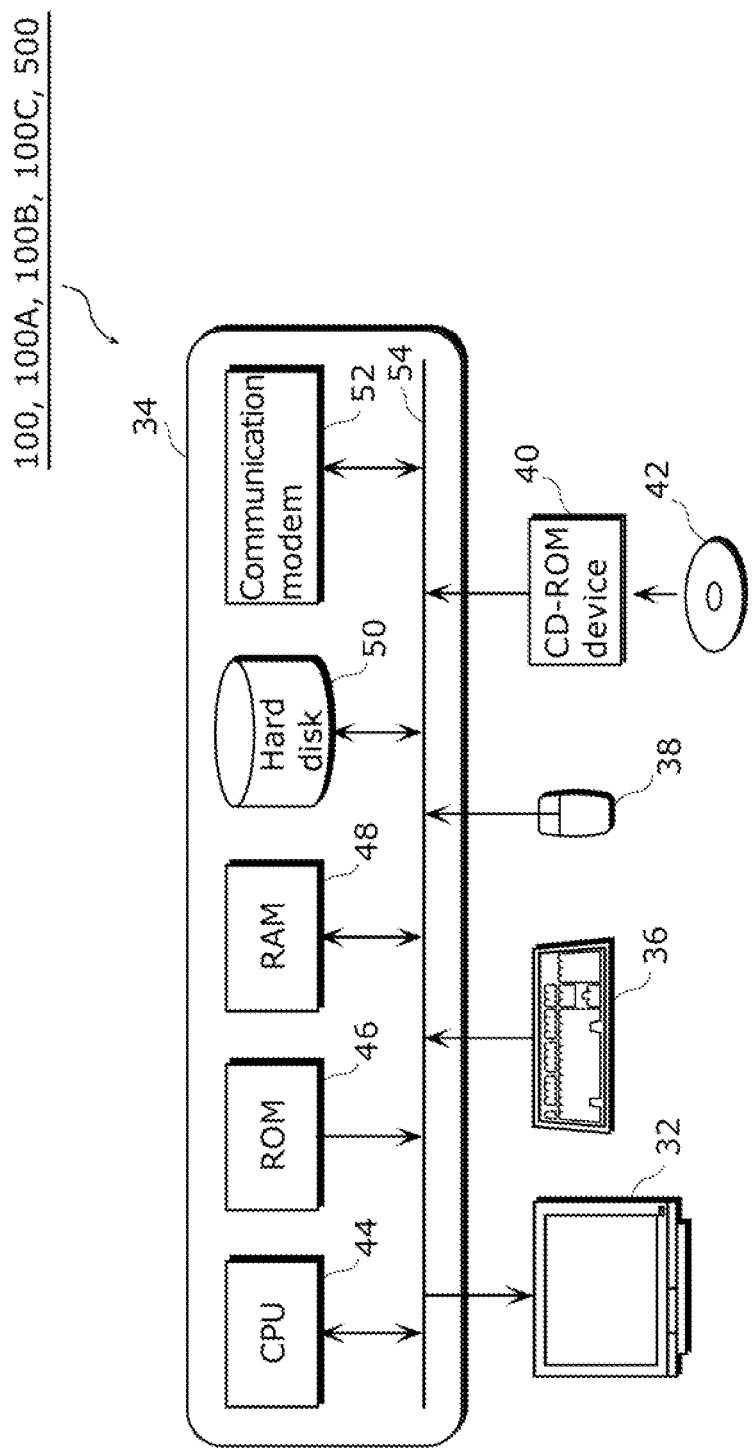
[FIG. 17]

FIG. 17 is a block diagram of a hardware configuration of a computer system implementing the current control device 100 etc.

The current control device 100 etc includes, a computer 34, a keyboard 36 and a mouse 38 for instructing the computer 34, a display 32 for presenting information, such as a result of the computation by the computer 34, a compact disc-read only memory (CD-ROM) device 40 for reading a program executed by the computer 34, and a communication modem (not illustrated).

The program that is processing performed by the current control device 100 etc is stored in a CD-ROM 42 that is a computer-readable medium, and is read by the CD-ROM device 40. Alternatively, the program is read by a communication modem 52 via a computer network.

The computer 34 includes a central processing unit (CPU) 44, a read only memory (ROM) 46, a random access memory (RAM) 48, a hard disk 50, the communication modem 52, and a bus 54.

The CPU 44 executes a program read through the CD-ROM device 40 or the communication modem 52. The ROM 46 stores a program and data necessary for operating the computer 34. The RAM 48 stores data, such as a parameter for executing a program. The hard disk 50 stores, for example, a program and data. The communication modem 52 communicates with other computers via the computer network. The bus 54 is interconnected to the CPU 44, the ROM 46, the RAM 48, the hard disk 50, the communication modem 52, the display 32, the keyboard 36, the mouse 38, and the CD-ROM device 40.

A part of or an entire of the constituent elements included in each apparatus above may be configured of a single system Large Scale Integrated circuit (LSI). The system LSI is a super multi-functional LSI manufactured by integrating the constituent elements into a single chip. More specifically, the system LSI is a computer system including a microprocessor, a ROM, a RAM, and the like. The RAM stores a computer program. The microprocessor operates according to the computer program, so that the system LSI fulfills the functions.

Furthermore, a part or an entire of the constituent elements included in each apparatus above may be configured of an IC card detachable from the apparatus or a single module. The IC card or the module is a computer system including the microprocessor, the ROM, the RAM and the like. The IC card or the module may include the super multi-functional LSI. The microprocessor operates according to the computer program, so that the IC card or the module fulfills the functions. The IC card or the module may have tamper-resistance.

The present invention may be any of the above methods. Furthermore, the present invention may be a computer program which causes a computer to execute these methods, and a digital signal included in the computer program. Here, the software for realizing the current control device according to each embodiment is such a program described below.

Specifically, the program causes a computer to execute: obtaining information indicating non-linear components included in load current that is current to be supplied to a load device; determining a first current so as to include the non-linear components; causing a current source to output the first current by notifying the current source of a command value to output the determined first current.

Moreover, in the present invention, the computer program or the digital signal may be recorded on a computer-readable recording medium, such as a flexible disk, a hard disk, a CD-ROM, an MO, a DVD, a DVD-ROM, a DVD-RAM, a Blu-ray Disc (BD) (Registered trademark), a USB memory, a memory card such as an SD card, and a semiconductor memory. Moreover, the present invention may be the digital signal recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a microprocessor and a memory. The memory may store the computer program, and the microprocessor may operate according to the computer program.

Furthermore, the present invention may execute the computer program or the digital signal in another independent computer system by recording the computer program or the digital signal on the recording medium and transporting the recording medium, or by transmitting the computer program or the digital signal via a network and the like.

Each embodiment of the present invention may be applied regardless of the distribution method of the power distribution system. As an example, another embodiment of the present invention is described which is directed to a three-phase four-wire distribution system.

(Embodiment 3)

FIG. 18A is a conceptual diagram of a current control system where a voltage source 210, a current source 310A and a current source 310B that are controlled by a current control device 100D supply power to a group of load devices 1000 in a three-phase four-wire distribution system according to Embodiment 3.

As shown in FIG. 18A, the voltage source 210 outputs current $i_{SB1\_ABC}$ and voltage $V_{SB1\_ABC}$. The current sources 310A and 310B connected in parallel output current $i_{SB2\_ABC}$ and $i_{SB39\_ABC}$, respectively. Here, for the purpose of description, one current source and two current sources are connected in parallel, however, the number of the voltage sources and the current sources is not limited to the example. For example, three or more current sources may be connected in parallel. Hereinafter, the current source 310A and the current source 310B are collectively referred to as a current source 310.

The current output from the voltage source 210 and the current source 310 is supplied as $i_{LOAD\_ABC}$ to the group of load devices 1000. More specifically, the load devices 1000A, 1000B, 1000C, 1000D, and 1000E that are load devices included in the group of load devices 1000 respectively receive current $i_{LOAD\_A1}$, $i_{LOAD\_B1}$, $i_{LOAD\_C1}$, $i_{LOAD\_ABC1}$ and $i_{LOAD\_ABC2}$.

Here, each of the load device 1000A and the load device 1000B is a single phase rectifier load. The load device 1000C is a single phase resistance load. The load device 1000D is a three-phase rectifier load. The load device 1000E is a three-phase resistance load.

The load devices 1000A, 1000B, and 1000C that are single phase loads have different capacity. As a result, unbalanced components are generated in the $i_{LOAD\_ABC}$. Furthermore, the load devices 1000A, 1000B, and 1000D that are rectifier loads generate non-linear components in $i_{LOAD\_ABC}$. The non-linear components and unbalanced components thus generated cause distortion of load current $i_{LOAD\_ABC}$. However, according to the current control device 100D according to Embodiment 3, it is possible to reduce influences given by the distortion to the voltage source 210. Hereinafter, referring to FIG. 18B and FIG. 18C, waveforms are shown of current and voltage that flow in the current control system according to Embodiment 3.

Figure 18B:
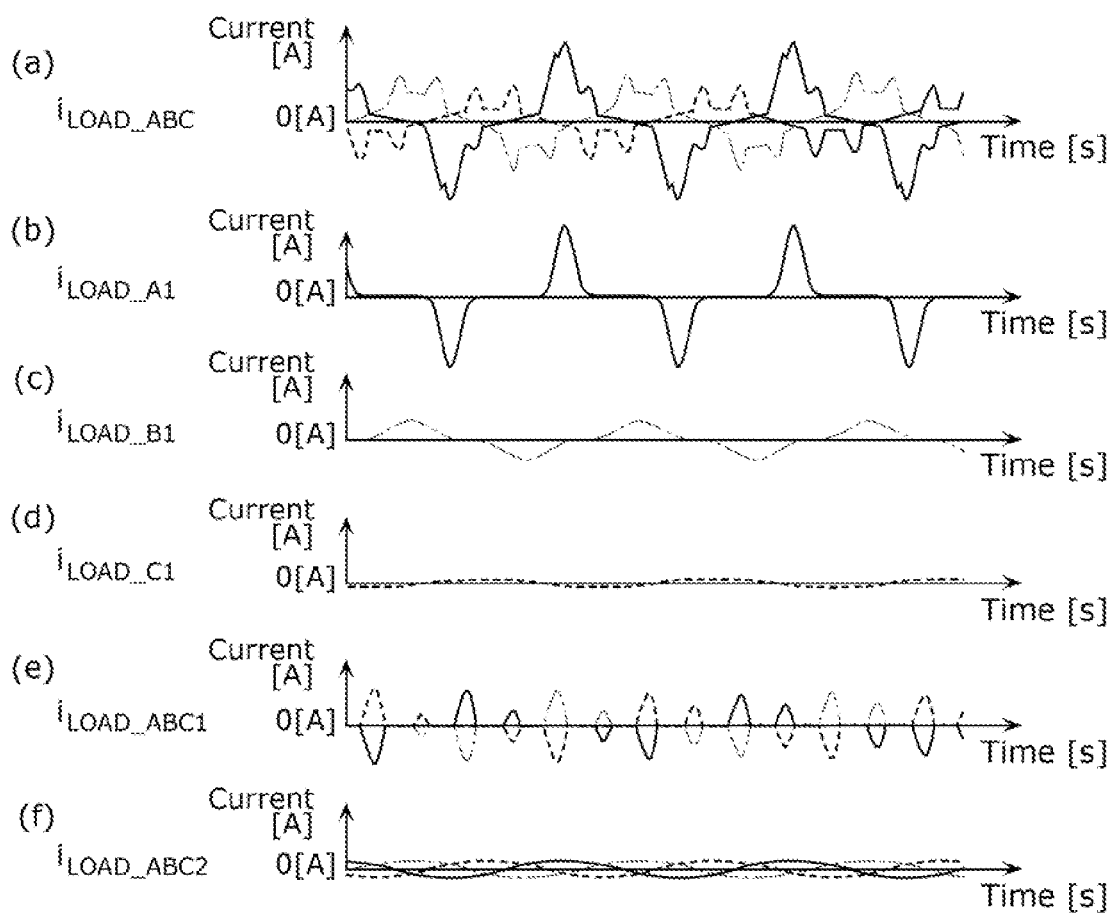
[FIG. 18B]

FIG. 18B shows current waveforms of $i_{LOAD\_ABC}$, $i_{LOAD\_A1}$, $i_{LOAD\_B1}$, $i_{LOAD\_C1}$, $i_{LOAD\_ABC1}$, and $i_{LOAD\_ABC2}$ shown in FIG. 18A. The vertical axis represents magnitude of current [A], and the horizontal axis represents elapsed time [s]. More specifically, in FIG. 18B, (a) shows the waveform of $i_{LOAD\_ABC}$, (b) shows the waveform of $i_{LOAD\_A1}$, (c) shows the waveform of $i_{LOAD\_B1}$, (d) shows the waveform of $i_{LOAD\_C1}$, (e) shows the waveform of $i_{LOAD\_ABC1}$, and (f) shows the waveform of $i_{LOAD\_ABC2}$.

As shown in FIG. 18, non-linear patterns are found in the waveforms of $i_{LOAD\_A1}$ and $i_{LOAD\_B1}$ that are current respectively supplied to the load devices 1000A and 1000B that are single phase rectifier loads each connected to different phase.

These waveforms also have different current amplitude. Furthermore, the waveform of three-phase current $i_{LOAD\_ABC1}$ supplied to the load device 1000D that is a three-phase rectifier load has a non-linear pattern. As a result, current $i_{LOAD\_ABC}$ supplied to the group of load devices 1000 also has a non-linear waveform and phase unbalance.

Figure 18C:
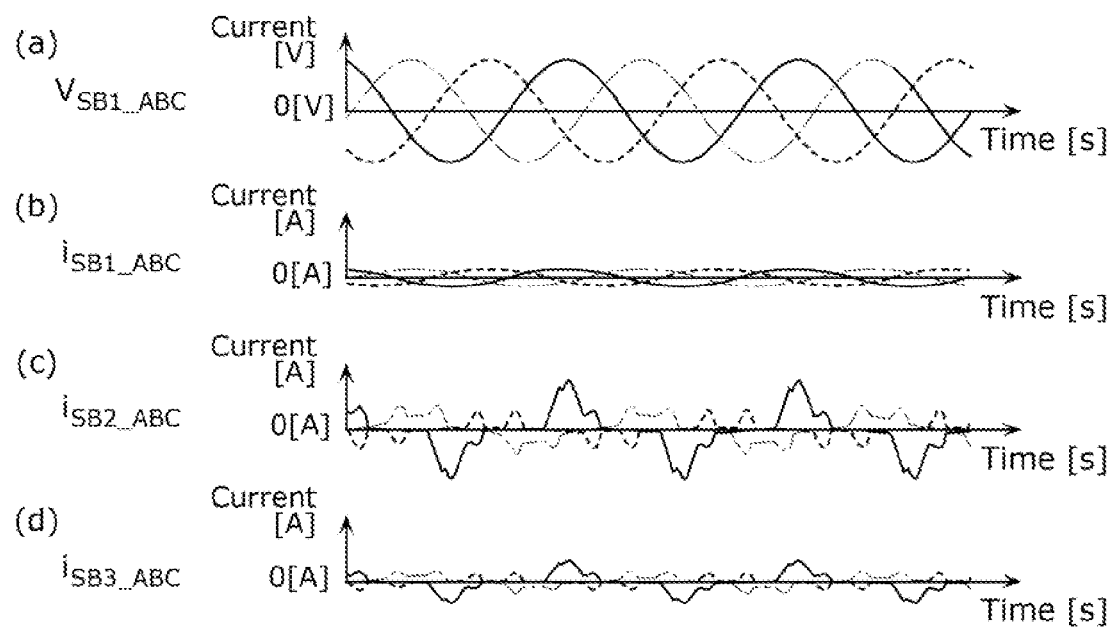
[FIG. 18C]

In FIG. 18C, (a) shows the waveform of $V_{SB1\_ABC}$ shown in FIG. 18A. The vertical axis represents magnitude of voltage [V], and the horizontal axis represents elapsed time [s]. In FIG. 18C, (b), (c), and (d) respectively show current waveforms of $i_{SB1\_ABC}$, $i_{SB2\_ABC}$, and $I_{SB3\_ABC}$. The vertical axis represents magnitude of current [A], and the horizontal axis represents elapsed time [s].

As shown in FIG. 18C, the current $i_{SB2\_ABC}$ and $i_{SB3\_ABC}$ output by the current source 310 according to Embodiment 3 have linear waveform patterns. On the other hand, the current $i_{SB1\_ABC}$ output from the voltage source 210 has a sine wave pattern. This is because, instead of $i_{SB1\_ABC}$, $i_{SB2\_ABC}$ and $i_{SB3\_ABC}$ are influenced by non-linear components included in $i_{LOAD\_ABC}$. As a result, the voltage $V_{SB1\_ABC}$ of the voltage source 201 has a sine wave pattern.

As described above, in the same manner as in Embodiment 1, the current control device 100D according to Embodiment 3 controls the current source 310 and the voltage source 210 such that the current source 310 preferentially outputs current having a waveform pattern corresponding to the non-linear components included in $i_{LAOD\_ABC}$. As a result, it is possible to reduce the distortion of the waveform of $V_{SB1\_ABC}$. Furthermore, the current output by the voltage source 210 is balanced by the current source 310 outputting unbalanced components included in $i_{LOAD\_ABC}$ as $i_{SB2\_ABC}$ and $i_{SB3\_ABC}$. As a result, the voltage source 210 is capable of outputting stable three-phase balanced voltage as $V_{SB1\_ABC}$.

Figure 19:
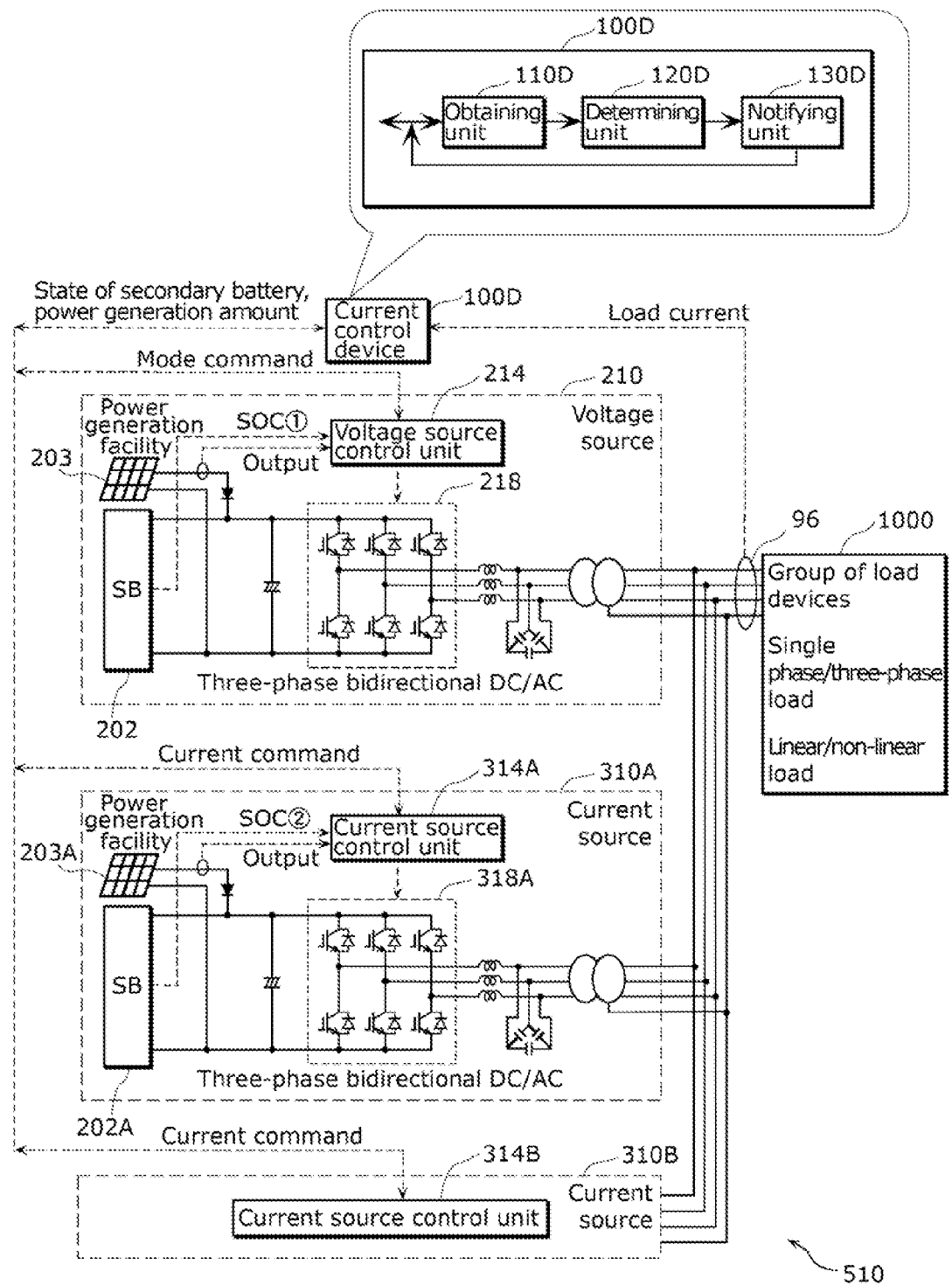
[FIG. 19]

Next, referring to FIG. 19, a description is given of a structure of a current control system which includes the current control device 100D according to Embodiment 3.

FIG. 19 is a diagram of a structure of a current control system 510 which includes the current control device 100D according to Embodiment 3. As shown in FIG. 19, the current control system 510 includes a current control device 100D, a voltage source 210, current sources 310A and 310B, a group of load devices 1000, and a current sensor 96. In the following description, unless specifically mentioned, it is assumed that the current control system 510 operates in an autonomous operating mode, in the similar manner to Embodiment 1. Furthermore, the voltage source 210, and the current source 310A, and the current source 310B are connected in parallel.

The current control device 100D is a current control device which supplies current to the group of load devices 1000 by controlling the voltage source 210 and the current source 310. More specifically, the current control device 100D includes an obtaining unit 110D, a determining unit 120D, and a notifying unit 130D.

The obtaining unit 110D obtains information indicating non-linear components and unbalanced components included in load current that is current supplied to the group of load devices 1000. Unlike the obtaining unit 110 according to Embodiment 1, the obtaining unit 110D obtains information indicating non-linear components included in each phase of three-phase current.

The obtaining unit 110D may obtain the amount of power generated by a power generation facility included in the voltage source 210 and the current source 310, as information used for determining the distribution of output power. Furthermore, the obtaining unit 110D may obtain information indicating the state of a secondary battery included in the voltage source 210 and the current source 310. Here, examples of the information indicating the state of the secondary battery include voltage between terminals of the secondary battery, temperature of the secondary battery, and state of charge (SOC) of the secondary battery. Detailed descriptions thereof are given later.

The obtaining unit 110 may further obtain master information indicating the operating mode in which that the current control device is to operate, in the similar manner to Embodiment 1.

The determining unit 120D determines a first current that is a ee-phase AC current output by the current source 310, so as to include the non-linear components and the unbalanced components obtained by the obtaining unit 110D. Specifically, the determining unit 120D determines the current to be output by the current source 310 such that the current source 310 preferentially outputs three-phase current corresponding to the non-linear components and the unbalanced components, rather than the voltage source 210.

The notifying unit 130D notifies the current source control unit included in the current source 310 of a command value for causing the current source 310 to output the first current determined by the determining unit. For example, in FIG. 19, the notifying unit 130D notifies the current source control unit 314A included in the current source 310A and the current source control unit 314B included in the current source 310B of current command values. As a result, the current source 310A and the current source 310B output the first current.

The voltage source 210 includes a secondary battery 202, a voltage source control unit 214, a power generation facility connected to a DC bus, and a three-phase bidirectional DC/AC voltage source 218. Examples of the power generation facility 203 include a power generation facility using natural energy such as a photovoltaic generation facility, or a wind power generation facility. Here, the following descriptions are given on the assumption that the power generation facility 203 is a photovoltaic (PV) generation facility.

The voltage source control unit 214 controls the three-phase bidirectional DC/AC voltage source 218 according to the command value obtained by the current control device 100D. Specifically, the voltage source control unit 214 causes the three-phase bidirectional DC/AC voltage source 218 to output, as current $i_{SB1\_ABC}$, the electric energy output by the secondary battery 202 and the power generation facility 203.

The current source 310A includes a secondary battery 202A, a current source control unit 314A, a power generation facility 203A connected to the DC bus, and a three-phase bidirectional DC/AC current source 318A. In the similar manner, the current source 310B includes a secondary battery 202B (not shown), a current source control unit 314B, a power generation facility 203B connected to the DC bus (not shown), and a three-phase bidirectional DC/AC current source 318B (not shown).

The current source control units 314A and 314B respectively control the three-phase bidirectional DC/AC current sources 318A and 318B according to the current command value obtained from the current control device 100D. Specifically, the current source control units 314A and 314B cause the three-phase bidirectional DC/AC current sources 318A and 318B to output current $i_{SB2\_ABC}$ and $i_{SB3\_ABC}$ according to the current command value determined based on the power output by the secondary battery and the power generation facility, respectively.

The group of load devices 1000 is a group of loads that is a mixture of single phase loads, three-phase loads, linear loads and non-linear loads each provided for a consumer. The group of load devices 1000 receives a supply of AC current $i_{LOAD\_ABC}$. With respect to the group of load devices 1000, an example of the linear load is an incandescent lamp, and examples of the non-linear load include an inverter air conditioner, inverter lighting, and a refrigerator. Furthermore, examples of the three-phase loads include large-capacity lighting, a motor, and an elevator.

In the similar manner to Embodiment 1, the current control device 100D changes the method of controlling the voltage source 210, the current sources 310A and 310B, based on the master information obtained from the master breaker 92. As described above, in Embodiment 3, the current control device 100D operates in the autonomous operating mode.

The current sensor 96 is a current sensor which measures load current that is current supplied to the group of load devices 1000. The current sensor 96 is attached to, for example, a distribution line of a consumer. The current sensor 96 outputs the measured current value to the current control device 100D via a wired or wireless communication network. The current sensor does not have to be positioned at a point shown as the current sensor 96. For example, the current sensor may be provided at an input terminal of a given load of the group of load devices 1000.

Figure 20:
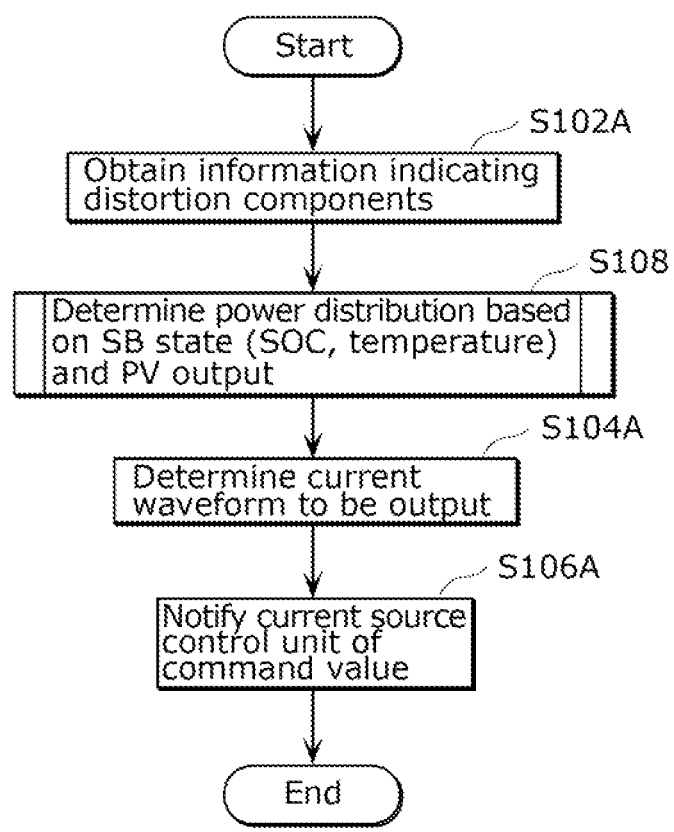
[FIG. 20]

FIG. 20 is a flowchart of an overall process performed by the current control device 100D according to Embodiment 3.

First, the obtaining unit 110D according to Embodiment 3 obtains information indicating distortion components included in $i_{LOAD\_ABC}$ (S102A). The distortion components include non-linear components caused by a rectifier load and unbalanced components cause by variation in capacity of single phase load.

Next, the determining unit 120B according to Embodiment 3 determines the distribution of power to be output, based on the state of the secondary battery and the power generated by the power generation facility (S108). Detailed descriptions thereof are given later.

The determining unit 120D then determines the waveforms of current to be output from the current sources 310A and 310B (S104A). For example, in the similar manner to Embodiment 1, the determining unit 120D determines the current waveforms of the current sources 310A and 310B such that the current sources 310A and 310B outputs non-linear components. In the case where the load current is unbalanced, the determining unit 120D determines three-phase balanced current to be output from the voltage source 210 as a reference waveform, and determines the waveform of the first current to be output from the current sources 310A and 310B such that the amplitude, phase, and frequency of each phase in the load current match the amplitude, phase, and frequency of the corresponding phase in the reference waveform. It may be that the determining unit 120D first determines the current waveforms of the current sources 310A and 310B such that the current sources 310A and 310B outputs the unbalanced components, and then determines the waveform of the first current to be output from the current sources 310A and 310B such that the load current are influenced by the remaining non-linear components.

Finally, the notifying unit 130D according to Embodiment 3 notifies the current source control units 314A and 314B of a command value for causing the current sources 310A and 310B to output the determined first current (S106A).

As described above, in Embodiment 3, the voltage source 210 is a voltage source which outputs three-phase AC voltage. Furthermore, the current source 310 is at least one current source which outputs three-phase AC current.

The obtaining unit 110D included in the current control device 100D obtains information indicating non-linear components included in each phase of the load current that is three-phase AC current. The obtaining unit 110D further obtains information indicating unbalanced components in the load current.

Furthermore, the determining unit 120D determines the first current such that each phase of the first current that is three-phase AC current includes the non-linear components included in the corresponding phase out of the non-linear components obtained by the obtaining unit 110D and the first current includes the unbalanced components obtained by the obtaining unit 120D.

Figure 21:
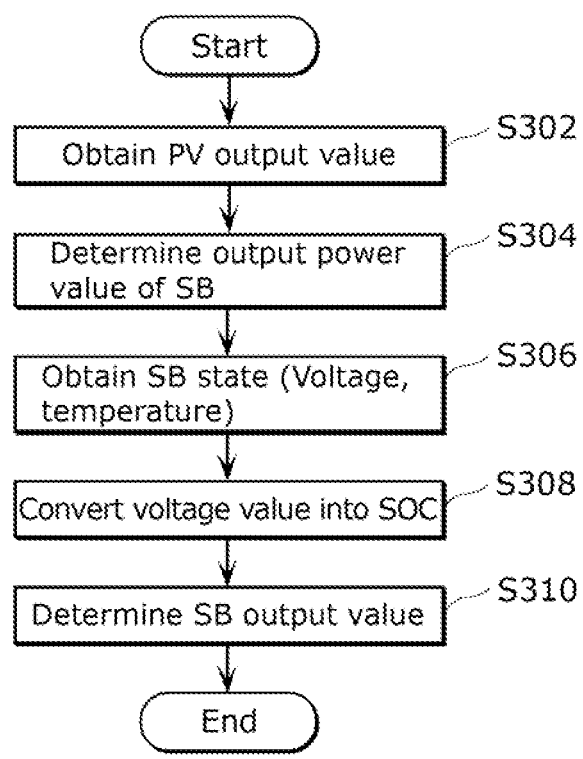
[FIG. 21]

Next, referring to FIG. 21, a description is given of power distribution determination process performed by the determining unit 120D according to Embodiment 3.

FIG. 21 is a detailed flowchart of an example of the output distribution determination process (Step S108 in FIG. 20) performed by the determining unit 120D.

Referring to FIG. 21, first, the determining unit 120D obtains photovoltaic power generation power value (PV output value) (S302).

The determining unit 120D then determines the total amount of the value of power to be output from the secondary battery by subtracting the load power value indicating the non-linear components from the obtained photovoltaic power generation power value (S304).

Next, the determining unit 120D determines the distribution percentage for distributing the total power value obtained in Step S304 to the secondary battery 202, the secondary battery 202A, and the secondary battery 202B. Specifically, the determining unit 120D obtains the voltage and the temperature of the secondary battery included in each of the voltage source 210 and the current sources 310A and 310B connected in parallel (S306). Subsequently, the determining unit 120D converts, into SOC, the obtained voltage value of each secondary battery by referring to predetermined information indicating the relationship between the voltage of the secondary battery and SOC (S308). The term "SOC" refers to a value which expresses the remaining capacity of the secondary battery in percentage.

The determining unit 120D then determines the distribution percentage of the power to be output by each secondary battery such that a secondary battery having a greater OSC outputs larger amount of power. Accordingly, the output value of the power to be output by each secondary battery is determined (S310).

With this, for example, in a three-phase distribution line, the current control device 100D causes the current source 310 to output unbalanced components included in the load current supplied to load devices each having a different capacity and connected to a different phase, as current having a different amplitude, phase, and frequency for each phase. Furthermore, the current control device 100D preferentially causes the current source 310 to output the non-linear components for each phase caused by a rectifier load. As a result, it is possible to keep the current output by the voltage source 210 linear and balanced. Hence, even in the case where groups of loads each having a different capacity are connected to respective phases, it is possible to reduce influences on the voltage waveform of the voltage source 210 by the unbalanced current.

In Step S304 in FIG. 21, the determining unit 120D compares the load power value and the photovoltaic power generation power value. However, the determining unit 120D may use the rating output of the current source 310, instead of the photovoltaic power generation power. Furthermore, the determining unit 120D may use the first current determined by the determining unit 120D, instead of the load current.

In Embodiment 3, the current source 310 may include, instead of the secondary battery, any power generation device such as a fuel cell, a wind generator system, or a cogeneration system.

The load devices included in the group of load devices 1000 in Embodiment 3 are an example. The group of load devices may include any number of load devices. In this case, each load device may be a single phase load or a three-phase load. Furthermore, each load device may be a linear load or a non-linear (rectifier) load. For example, in Embodiment 3, the group of load devices 1000 may include only rectifier loads.

Furthermore, the power distribution method in Embodiment 3 is a three-phase four-wire method, but may be, for example, a three-phase three-wire method.

Furthermore, in Embodiment 3, the current control device 100D may be provided inside the current source 310 or the voltage source 210.

Furthermore, any of Embodiments 1 to 3 and its variations may be combined.

It should be understood that the embodiments disclosed herein are illustrative and not limitative in any respect. The scope of the present invention is defined by the scope of the claims, rather than the description above, and is intended to include any modifications within the scope and meaning equivalent to the scope of the claims.

[Industrial Applicability]

The present invention is applicable to a current control device, and in particular, to a current control device and the like which causes a load device to output current by controlling a current source and a voltage source.

[Reference Signs List]
- 32 Display
- 34 Computer
- 36 Keyboard
- 38 Mouse
- 40 CD-ROM device
- 42 CD-ROM
- 44 CPU
- 46 ROM
- 48 RAM
- 50 Hard disk
- 52 Communication modem
- 54 Bus
- 90 Grid power supply
- 92 Master breaker
- 94, 95, 96 Current sensor
- 100, 100A, 100B, 100C, 100D Current control device
- 110, 110A, 11B, 110D Obtaining unit
- 112 Detecting unit
- 114, 114A, 114B, 114C Extracting unit
- 115, 115A Bandpass filter
- 116 Element
- 118 Output value receiving unit
- 120, 120D Determining unit
- 130, 130D Notifying unit
- 140 Master information receiving unit
- 150 Operating mode determining unit
- 200, 210, 810 Voltage source
- 202, 202A, 202B Secondary battery
- 203, 203A, 230B power generation facility
- 204, 214 Voltage source control unit
- 206 Bidirectional DC/DC charging and discharging device
- 208 Bidirectional DC/AC voltage source
- 218 Three-phase bidirectional DC/AC voltage source
- 300, 310, 310A, 310B, 820 Current source
- 302 fuel cell
- 304, 314A, 314B Current source control unit
- 306 One-way DC/DC boosting device
- 308 one-way DC/AC current source
- 318A, 318B Three-phase bidirectional DC/AC current source
- 400A, 400B, 900A, 900B, 1000A, 1000B, 1000C, 1000D, 1000E Load device
- 1000 Group of load devices
- 500, 510 Current control system

The invention claimed is:

1. A current control device which supplies a current to a first load device that is a resistance load and a second load device that is a rectifier load by controlling a current source and a voltage source, the current source including a first electric appliance, the voltage source including a second electric appliance, and the current control device comprising:
   a detecting unit configured to detect at least one of a first load current and a second load current, the first load current being supplied to the first load device and the second load device, and the second load current being supplied to the second load device;
   an extracting unit configured to extract non-linear components included in the first load current or the second load current detected by the detecting unit;
   a determining unit configured to determine a first current that includes the non-linear components extracted by the extracting unit; and
   a notifying unit configured to notify the current source of a command value to cause the current source to output the determined first current, the command value being for causing the current source to output the first current.

2. The current control device according to claim 1,
   wherein the extracting unit is configured to extract the non-linear components by subtracting, from the first load current or the second load current, a result obtained by applying a predetermined bandpass filter to the first load current or the school load current.

3. The current control device according to claim 1, further comprising
   an output value receiving unit configured to receive information indicating an output current output by at least one of the current source and the voltage source,
   wherein the extracting unit is configured to extract the non-linear components from the first load current or the second load current, based on information indicating the first load current or the second load current and the information indicating the output current.

4. The current control device according to claim 1,
   wherein the determining unit is configured to determine the first current and thereby preferentially cause the current source to output a current corresponding to the non-linear components rather than the voltage source.

5. The current control device according to claim 1,
   wherein, in the case where the obtained first load current or the obtained second load current is greater than rating of the current source, the determining unit is configured to determine a second current to be output by the voltage source, by subtracting the rating from the first load current or the second load current, and
   the notifying unit is configured to notify the voltage source of a command value for causing the voltage source to output the second current.

6. The current control device according to claim 1,
   wherein, in the case where the first load current or the second load current is smaller than rating of the current source, the determining unit is configured to determine a value of a second current to be output by the voltage source as 0, and the notifying unit is configured to notify the voltage source of a command value for causing the voltage source to output the second current.

7. The current control device according to claim 1, wherein the second electric appliance is an electric storage device.

8. The current control device according to claim 7, wherein, in the case where the first load current or second load current is smaller than rating of the current source, the determining unit is configured to determine a third current as the rating, and determine a fourth current as a current obtained by subtracting the first load current or the second load current from the rating, and the notifying unit is configured to notify the current source of a command value for causing the current source to output the third current, and notify the voltage source of a command value for causing the voltage source to charge the fourth current out of the third current.

9. The current control device according to claim 1, wherein the first electric appliance is a fuel cell.

10. The current control device according to claim 1, wherein the first electric appliance is a secondary battery.

11. The current control device according to claim 1, wherein the voltage source is a voltage source which outputs a three-phase AC voltage, the current source includes at least one current source which outputs a three-phase AC current, the extracting unit is configured to obtain information indicating non-linear components included in each phase of the first load current or the second load current that is a three-phase AC current, and information indicating unbalanced components included in the first load current or second load current, and the determining unit is configured to determine the first current that is a three-phase AC current, the first current including phases each of which includes the non-linear components of a corresponding phase of the first load current or the second load current obtained by the extracting unit, and the first current including the unbalanced components obtained by the extracting unit.

12. The current control device according to claim 1, wherein each of the first electric appliance and the second electric appliance operates autonomously while being disconnected from a power grid, and the current source outputs the first current using the voltage source.

13. The current control device according to claim 1, wherein the current control device is provided inside the current source or the voltage source.

14. A current control method of supplying a current to a first load device that is a resistance load and a second load device that is a rectifier device by controlling a current source and a voltage source, the current source including a first electric appliance, the voltage source including a second electric appliance, and the current control method comprising:

detecting at least one of a first load current and a second load current, the first load current being supplied to the first load device and the second load device, and the second load current being supplied to the second load device;

extracting non-linear components included in the first load current or the second load current detected in the detecting;

determining a first current that includes the non-linear components extracted in the extracting; and notifying the current source of a command value to cause the current source to output the determined first current, the command value being for causing the current source to output the first current.

15. A current control system comprising:
the current control device according to claim 1;
a current source controlled by the current control device; and
a voltage source controlled by the current control device.

* * * * *